United States Patent [19]

MacPherson et al.

[11] Patent Number: 5,583,877
[45] Date of Patent: Dec. 10, 1996

[54] METHOD AND APPARATUS FOR GENERATING HIGH POWER LASER PULSES IN THE TWO TO SIX MICRON WAVELENGTH RANGE

[75] Inventors: David C. MacPherson, Conifer; Loren D. Nelson, Evergreen; Martin J. O'Brien, Bailey, all of Colo.

[73] Assignee: Ophir Corporation, Littleton, Colo.

[21] Appl. No.: 437,676

[22] Filed: May 9, 1995

[51] Int. Cl.⁶ .................................................. H01S 3/30
[52] U.S. Cl. ........................ 372/4; 372/10; 372/69; 372/39; 372/20
[58] Field of Search .......................... 372/4, 20, 10, 372/69, 39

[56] References Cited

U.S. PATENT DOCUMENTS

| | | | |
|---|---|---|---|
| 4,151,486 | 4/1979 | Itzkan et al. | 372/4 |
| 4,194,170 | 3/1980 | Kurnit | 372/4 |
| 4,348,599 | 9/1982 | Pradre et al. | 307/426 |
| 4,389,617 | 6/1983 | Kurnit | 330/4.3 |
| 4,394,623 | 7/1983 | Kurnit | 330/4.3 |
| 4,618,783 | 10/1986 | Pardere et al. | 307/426 |
| 4,829,528 | 5/1989 | Band et al. | 372/3 |
| 4,853,543 | 3/1989 | Ozdemir | 250/372 |
| 5,034,952 | 7/1991 | Mansfield et al. | 372/4 |
| 5,091,778 | 2/1992 | Keeler | 358/95 |
| 5,105,434 | 4/1992 | Krupke et al. | 373/69 |
| 5,163,061 | 11/1992 | Moberg | 372/3 |
| 5,250,810 | 10/1993 | Geiger | 250/338.5 |
| 5,251,221 | 10/1993 | Stultz et al. | 372/10 |
| 5,252,060 | 10/1993 | McKinnon et al. | 431/12 |
| 5,257,085 | 10/1993 | Ulich et al. | 356/318 |
| 5,260,963 | 11/1993 | Baird et al. | 372/95 |
| 5,272,717 | 12/1993 | Stultz | 372/3 |
| 5,276,696 | 1/1994 | Callender | 372/32 |
| 5,414,723 | 5/1995 | Krapchev | 372/4 |

OTHER PUBLICATIONS

Bischel, W. K., et al. Wavelength Dependence of Raman Scattering Cross Sections From 200–600nm., pp. 181–187, *Eximers*, 1983, Edited by Rhodes, C. K. (No Month).

Frey, R., et al., High–efficiency pulse compression with intracavity Raman oscillators, pp. 437–439, Optics Letters, vol. 8, No. 8 Aug. 1983.

Frey, R., et al., High–Efficiency Pulse Compression with Intracavity Raman Amplifiers, pp. 786–796, IEEE journal of Quantum electronics, vol. QE–20, No. 7 Jul. 1984.

(List continued on next page.)

*Primary Examiner*—Leon Scott, Jr.
*Attorney, Agent, or Firm*—Chester E. Martine, Jr.

[57] ABSTRACT

Apparatus performs a method of generating one or more output laser pulses in a range of 2 to 6 microns. When a plurality of the output laser pulses are generated, a first output pulse has any selected wavelength within the range and a second output pulse is temporally closely spaced relative to the first output pulse and has a chosen wavelength differing from the selected wavelength. An oscillator laser cavity is provided with a tunable oscillator rod capable of generating initial laser pulses within a range of from 750 to 1000 nm, and a tuning element is coupled to the rod. A flashlamp is operable to pump the rod. For two pulse operation, the flashlamp has a given duration. A Q-switch provides the initial laser pulses upon operation of the tuning element and the flashlamp. A Raman device coupled to the rod shifts the wavelength of such initial laser pulse into the range of from 2 to 6 microns to form the output laser pulse having a wavelength within the range. For multiple pulses, a controller causes the Q-switch to provide first and second ones of the initial laser pulses, spaced by a time interval less than the given duration. Also, a selector coupled to the tuning element is operable within such duration to successively select the wavelength of the first output pulse and the chosen wavelength of the second initial pulse. The Raman device is responsive to each of the initial light pulses to generate radiation at first and second Stokes wavelengths, each of said the output laser pulses being radiation at the second Stokes wavelength.

40 Claims, 29 Drawing Sheets

OTHER PUBLICATIONS

De Rougemont, F., et al., High–efficiency pulse compression with externally pumped intracavity Raman oscillator., pp. 460–462, Optics Letters, vol. 9, No. 10, Oct. 1984.

Bilbe, R. M., et al., Jun. 1990, An Improved Raman Lidar System For the Remote Measurement of Natural gases Released Into The Atmosphere, Measurement Science Technology, 1, No. 6, pp. 495–499.

Hanson, F. et al., Sep. 1993, Gain Measurements and Average Power Capabilities of Cr3+:LiSrAlF6, Optics Letters, 18, No. 17, pp. 1423–1425.

MacPherson, D. C., et al., Jul. 1989, Stimulated Raman Scattering In the Visible With A Multipass Cell, IEEE Journal of Quantum Electronics, 25, No. 7, 1741–1746.

Scott, B. P., et al., May 1990, Efficient Raman Energy Extraction in HD, Applied Optics, 20, No. 29, pp. 2217–2218.

Stalder, M., et al., 1991, Flashlamp Pumped Cr:LiSrAlF6, Applied Physics Letters, 58, (3) 21 Jan. 1991 Jan.

Swanson, R. C., et al., Dec. 1990, Quantum statistics of the Gain–Narrowed Raman Linewidth in H2, American Physical Society; Review A, 42, No. 11, pp. 6774–6783.

Zhang, Q., et al., Jan./1992, Electronically Tuned Diode–Laser–Pumped Cr:liSrAlF6 Laser, Optics Letters, 17, No. 1, pp. 43–45.

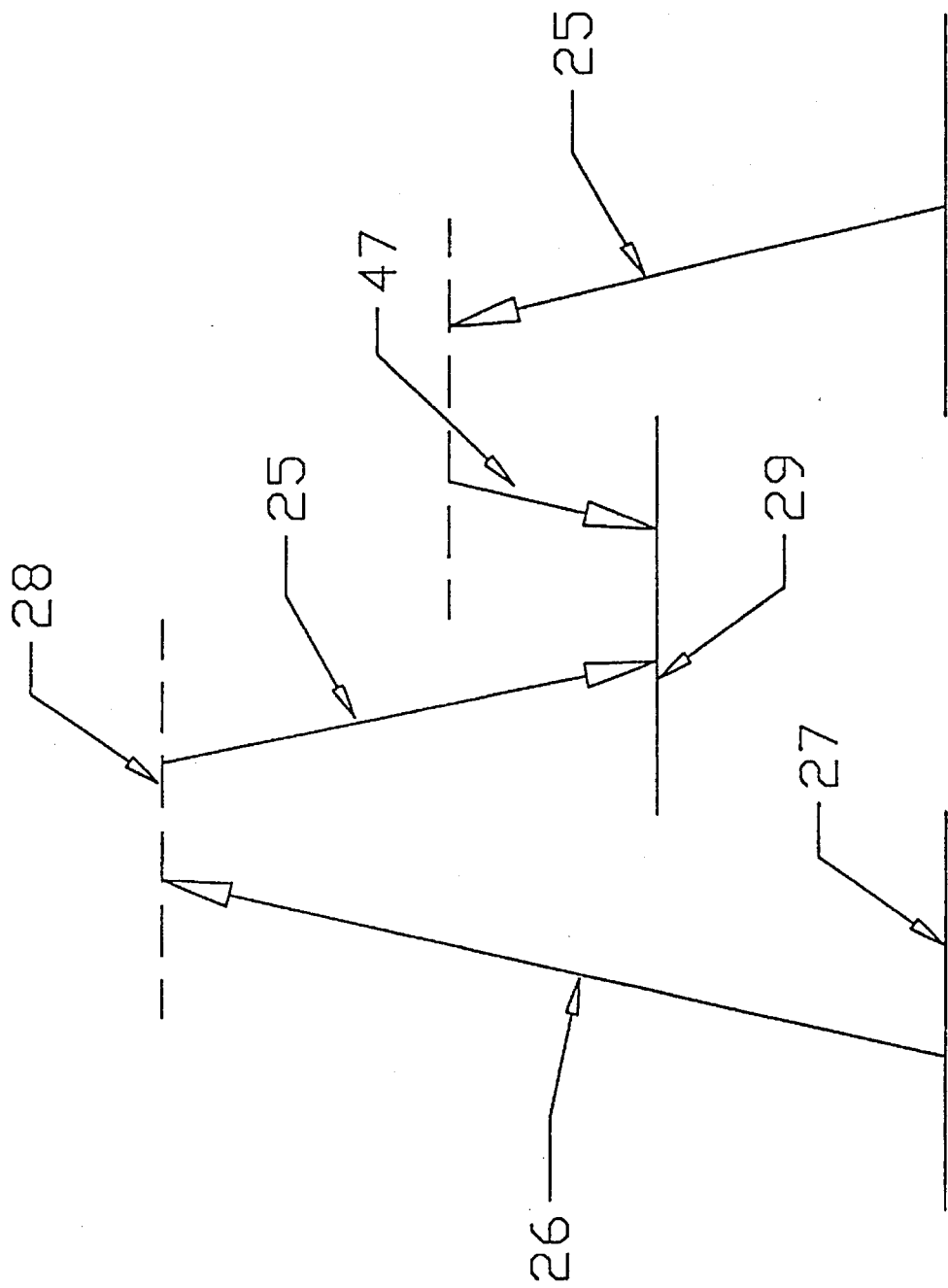

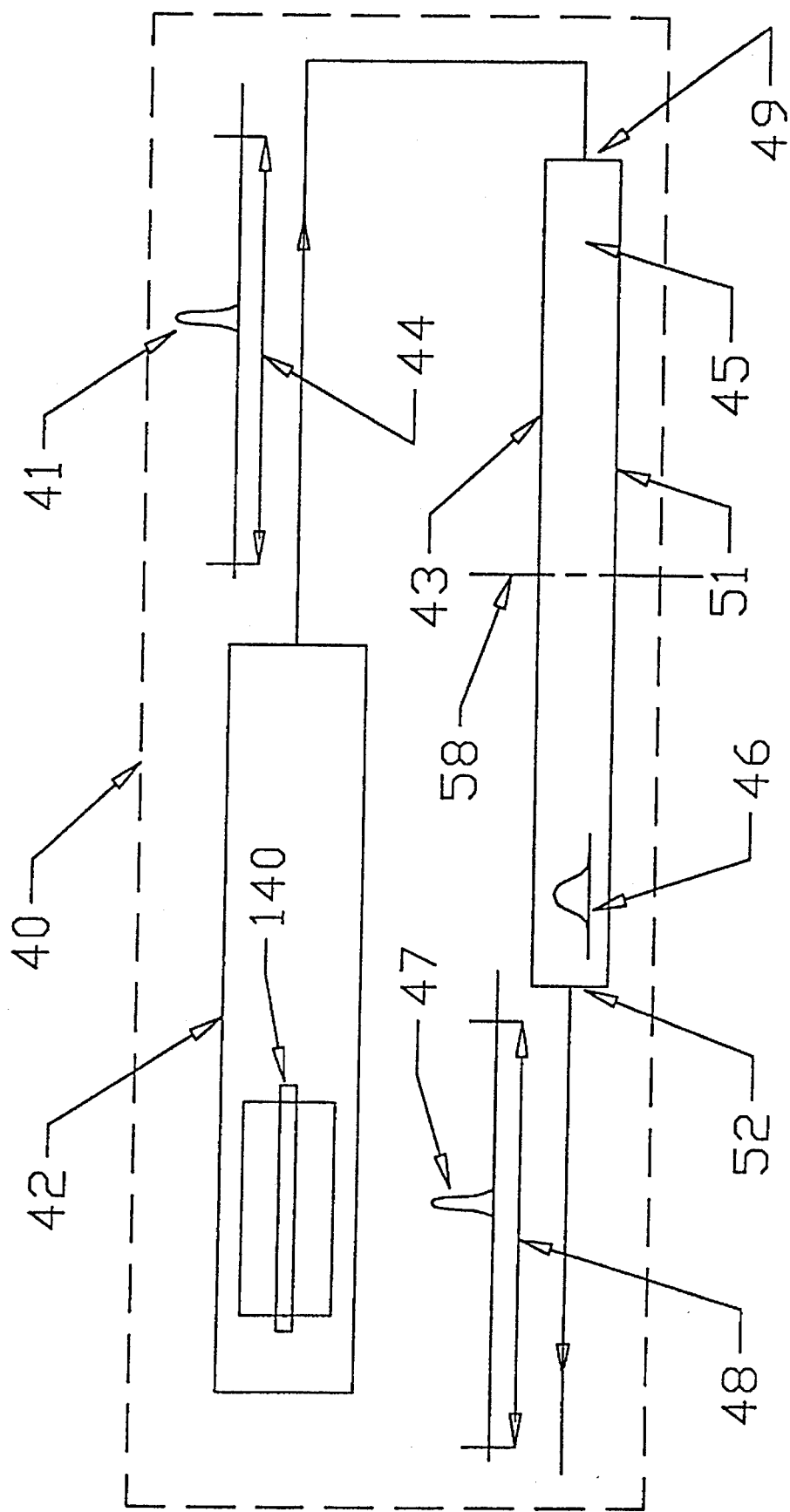

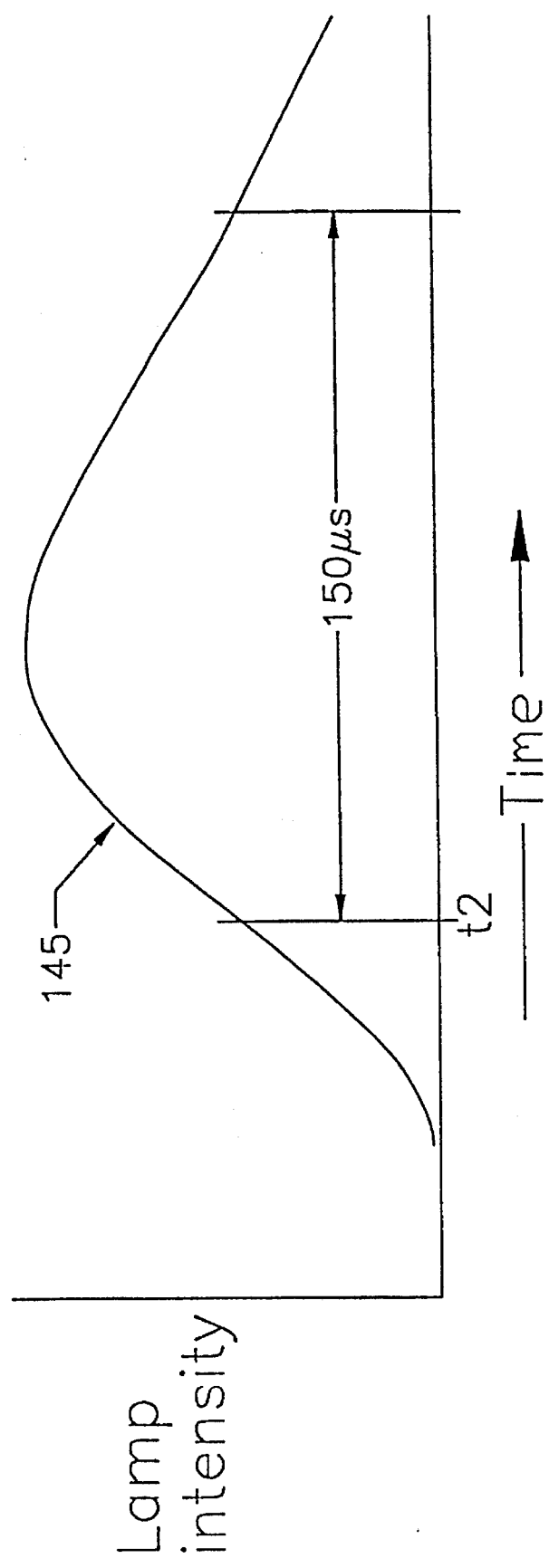

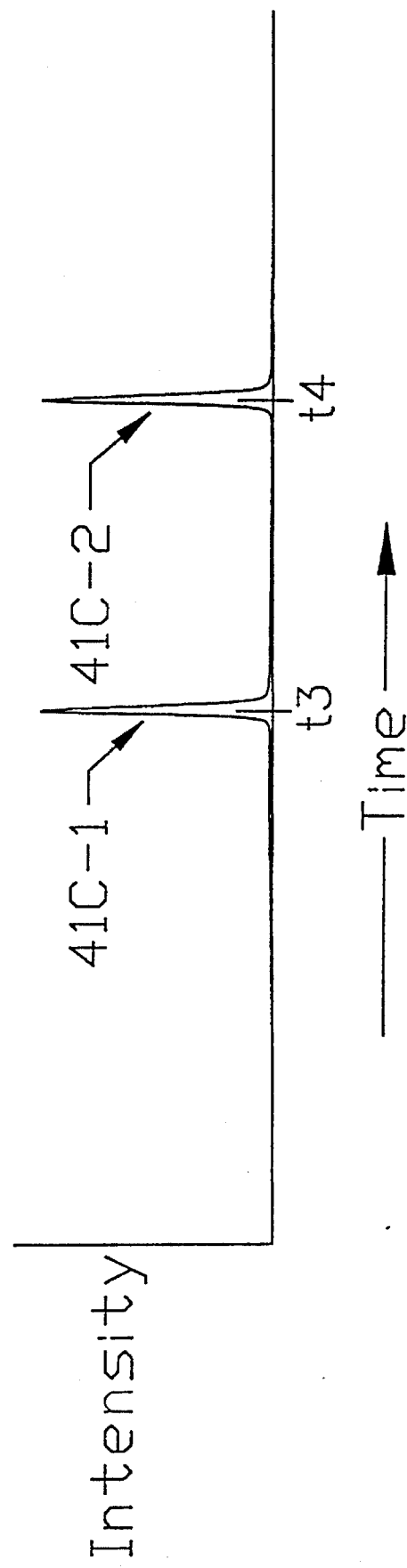

FIG. 20

STEP 156  PROVIDE CAVITY CAPABLE OF GENERATING PUMP PULSE HAVING ANY WAVELENGTH IN RANGE OF 750 - 1000 NM

STEP 157  TUNE CAVITY TO SELECT ANY WAVELENGTH IN RANGE OF 750 TO 1000 NM

STEP 158  Q-SWITCH CAVITY TO GENERATE INITIAL PULSE HAVING SELECTED WAVELENGTH

STEP 159  DOUBLE RAMAN SHIFT THE INITIAL PULSE TO GENERATE OUTPUT PULSE IN 2 - 6 MICRON RANGE

FIG. 21A

STEP 161  SELECT PARAMETERS OF RAMAN DEVICE TO ENERGETICALLY FORBID THIRD AND HIGHER STOKES

STEP 162  PROVIDE CAVITY CAPABLE OF GENERATING PUMP PULSE HAVING ANY WAVELENGTH IN RANGE ABOVE MINIMUM EF WAVELENGTH TO 1000 NM

STEP 163  TUNE CAVITY TO SELECT ANY WAVELENGTH IN THAT RANGE

STEP 164  Q-SWITCH CAVITY TO GENERATE INITIAL PULSE HAVING SELECTED WAVELENGTH IN THAT RANGE

STEP 166  DOUBLE RAMAN SHIFT THE INITIAL PULSE TO GENERATE OUTPUT PULSE IN 2.3 TO 6 MICRON RANGE

FIG. 21B

STEP 161A  SELECT H2 AS MEDIUM 45

STEP 161B  SELECT INITIAL PULSE 41 HAVING WAVELENGTH ABOVE MINIMUM EF WAVELENGTH

FIG. 22

STEP 170 — SELECT MEDIUM 45 TO INCLUDE PHASE-MATCHING GAS

STEP 171 — PROVIDE CAVITY CAPABLE OF GENERATING PUMP PULSE HAVING ANY WAVELENGTH IN RANGE OF 750 - 1000 NM

STEP 172 — TUNE CAVITY TO SELECT ANY WAVELENGTH IN THAT RANGE

STEP 173 — Q-SWITCH CAVITY TO GENERATE INITIAL PULSE HAVING SELECTED WAVELENGTH IN THAT RANGE

STEP 174 — DOUBLE RAMAN SHIFT THE INITIAL PULSE TO GENERATE OUTPUT PULSE IN 2 - 6 MICRON RANGE

FIG. 23

STEP 181  PROVIDE CAVITY CAPABLE OF GENERATING PUMP PULSE HAVING ANY WAVELENGTH IN RANGE ABOVE MINIMUM EF TO 1000 NM

STEP 182  OPERATE FLASH LAMP 98 TO PRODUCE PULSE 145

STEP 183  TUNE CAVITY TO SELECT ANY WAVELENGTH IN THAT RANGE

STEP 184  SELECT H2 AS MEDIUM 45

STEP 185  Q-SWITCH CAVITY AT TIME t3 TO GENERATE INITIAL PULSE 146-1 AND GENERATE INITIAL PULSE 41C-1 HAVING SELECTED WAVELENGTH IN THAT RANGE

STEP 186  DOUBLE RAMAN SHIFT THE INITIAL PULSE TO GENERATE FIRST OUTPUT PULSE 47-1 IN 2 - 6 MICRON RANGE

STEP 187  TUNE CAVITY TO SELECT NEW WAVELENGTH IN RANGE OF 750 - 1000 NM AND DIFFERENT FROM WAVELENGTH OF THE FIRST INITIAL PULSE 41C-1

STEP 188  Q-SWITCH CAVITY AT TIME t4 TO GENERATE SECOND PULSE 146-2 AND GENERATE SECOND INITIAL PULSE 41C-2 HAVING SUCH SECOND SELECTED WAVELENGTH

STEP 189  DOUBLE RAMAN SHIFT THE SECOND INITIAL PULSE 41-C TO GENERATE SECOND OUTPUT PULSE 47-2 IN 2 - 6 MICRON RANGE

METHOD AND APPARATUS FOR GENERATING HIGH POWER LASER PULSES IN THE TWO TO SIX MICRON WAVELENGTH RANGE

STATEMENT OF U.S. GOVERNMENT RIGHTS

The U.S. Department of Energy has certain rights in the present invention under Contract No. DE-FG03-92ER81318 with Ophir Corporation.

BACKGROUND OF THE INVENTION

1. Field of the Invention

This invention relates to generating laser pulses, and more particularly to generating output laser pulses having any wavelength in a nominal range of two to six microns.

2. Discussion of Prior Art

Considerable effort has been invested over the past twenty years in generating continuously tunable infrared (IR) laser emission using optical parametric oscillators (OPO's). In the beginning it was thought that OPO's would quickly evolve to provide wavelength coverage throughout the mid IR. However, many years later problems remain and, in particular, generation of powerful laser pulses in the important 3 micron to 6 micron band has seen only very limited success.

An OPO is pumped with a fixed laser wavelength, typically 532 or 1060 nm, and uses a variable frequency shift to obtain tunable laser emission at a longer wavelength. For example, there are teachings of tuning ranges of 1.29 to 1.44 microns, of tuning ranges of 1.83 to 1.91 microns, and such ranges of 3.5 & 4 to 5 microns.

Considering pump lasers, OPO's are pumped with a fixed wavelength pump laser and thus can use the very well-developed, high gain Nd:YAG medium or possibly a Tm:YAG or Ho:YAG laser. However, OPO's provide a tunable wavelength shift in a nonlinear shifting crystal. Major problems are encountered with nonlinear crystals for OPO's, for example, absorption, phase matching, and optical damage. In Applicants' experience, due to these problems there is no nonlinear crystal which can efficiently convert 1.06 micron pulses to the 3.4 micron to 6 micron band. For example, a shift from 1.064 microns to 3.2 microns and a rapid fall-off of transmission above 3.1 microns have been reported, In Applicants' experience, to reach the 3.4 to 6 micron band one must simultaneously use two sequential OPO's. Alternatively, one must start with a 2 micron Tm:YAG laser. However, currently available Tm:YAG lasers generate much lower average powers than the power available from Nd:YAG lasers. Finally, considering conversion efficiency, commercial OPO systems generate about 2 mJ pulses at 3 microns and less powerful pulses at longer wavelengths. Beyond 4 microns the available OPO systems produce much less than 1 mJ per pulse.

In Applicants' experience, prior laser systems have limited ability to generate output laser pulses that are rapidly tunable to any wavelength in the range of nominally 2 to 6 microns. Problems with OPO's include crystal damage at high powers, thermal lensing in the crystals, inherently large and complex optical chains, and the lack of suitable high-efficiency crystals for converting common lasers to the 3 micron region and longer wavelengths. Frequency doubling carbon dioxide and carbon monoxide laser energy to the mid-infrared limits the wavelengths available to those which are shiftable from known strong carbon dioxide or carbon monoxide lines. Thus infinite laser tunability is not possible by frequency doubling gas phase lasers. Lead salt lasers operate directly in the 2–5 micron band but have very low power (a few milliwatts) and require cryogenic cooling to operate.

SUMMARY OF THE PRESENT INVENTION

With these considerations in mind, there is still a need for a system which is capable of generating high power pulses in the 2 to 6 micron range, where the system does not have the limitations of the OPO's, for example. The present invention seeks to overcome these problems by using a tunable solid state laser and two fixed frequency Raman shifts in hydrogen ($H_2$) to generate pulses across the 2 to 6 micron wavelength band. The advantage of using a tunable laser to generate wavelength tunable output pulses is that Raman scattering in a $H_2$ medium can be used for the shifting.

In greater detail, Applicants have found that the availability of a Cr:LiSAF laser tunable in the 750 to 1000 nm range enables two Raman shifts in $H_2$ medium to the 2 to 6 micron range, with no further shifts permitted. To reach the 2 to 6 micron range via two shifts in $H_2$, the pump wavelength should be in the approximate region from 750 to 1000 nm. Applicants have found that both Cr:LiCAF and Ti:SAF cover the short wavelength part of this band and can be used to generate second Stokes wavelengths out to about 2.4 microns. On the other hand, in the tuning region from 850 nm to 1000 nm, which results in second Stokes emission from 2.9 microns out to 6 microns, the competing OPO technology gives low efficiency and performs poorly.

For purposes of generating Applicants' pulses, Applicants have found that the best nonlinear medium for Raman shifting is $H_2$ gas at nominally ten atmospheres pressure. An $H_2$-filled cell is relatively easy to fabricate and difficult to damage with high peak power laser pulses. For efficient conversion using the four-wave-mixing process, Applicants use one or more phase-matching gases added to the $H_2$. Two good phase-matching gases are carbon dioxide ($CO_2$) and nitrogen dioxide ($NO_2$). $H_2$ is transparent throughout the mid IR region, however, the $CO_2$ is not. By choosing either $CO_2$ or $NO_2$ for phase matching, the entire 2 micron to 6 micron region can be reached at high efficiency without significant absorption loss.

Applicants' dual-Raman shift laser system produces nominally 20 mJ pulses at 3 microns, 10 mJ at 5 microns, and 2 mJ at 6 microns, and is thus substantially more powerful than available OPO techniques. Such dual or double-Raman shifted laser also tunes faster between wavelengths, is less complex, and does not suffer from shifting medium damage thresholds as do OPO's.

Applicants have also determined that when a tunable output is not required, a fixed input (provided e.g., by a Nd:YAG laser) may be shifted twice in a hydrogen Raman cell and a phase-matching gas used to maximize the shift to second Stokes while third Stokes is energetically forbidden.

Accordingly, the present invention contemplates providing methods of and apparatus for generating output laser pulses having any wavelength in a range of two to six microns. A feature of the present invention is the provision of an oscillator laser cavity controlled to generate an initial laser pulse within a tuning range of 750 to 1000 nm, and the use of a Raman device to double shift such initial laser pulse into such 2 to 6 micron range.

Another aspect of the present invention is an oscillator rod tunable to generate an initial laser pulse having any wavelength within a range of from 750 nm to 1000 nm.

A further aspect of the present invention is the generation of a laser output pulse in the form of substantial second Stokes radiation from a Raman device, while energetically forbidding output of third and higher Stokes radiation.

Another aspect of the present invention is to provide such Raman device including a cell containing a primary medium and one or more phase-matching gases therein, wherein the primary medium and the one or more phase-matching gases have a bulk refractive index vs. wavelength characteristic in which the bulk refractive index values corresponding to the wavelengths of such initial, first Stokes and second Stokes radiation are substantially linear.

A still further aspect of Applicants' invention is a second device coupled to tune the tunable laser material of the oscillator rod so that the initial light pulse has a selected wavelength within a tuning range of from 750 to 1000 nm, wherein a Raman device comprises a cell having a selected medium therein, the selected Raman medium having an intrinsic Raman shift, with a feature that the selected wavelength and the selected medium are effective to energetically forbid the shifting of the wavelength of the initial light pulse to the third order and higher Raman shifts so that the wavenumber of the second Stokes radiation of the output laser pulse is less than the wavenumber of the intrinsic Raman shift of the selected Raman medium.

An additional feature of the present invention resides in the generation of successive laser pulses having different wavelengths spaced by a chosen wavelength interval.

In another aspect of the present invention, apparatus is provided for generating a plurality of relatively high power, temporally closely spaced, output laser pulses. A first of the closely spaced pulses has any wavelength within the range of nominally 2 to 6 microns. A second of the closely spaced pulses has a wavelength differing from that of the first pulse by a chosen wavelength interval. A laser system is provided having an oscillator laser cavity with a tunable laser rod, a Q switch, and provisions for injection seeding. The rod is capable of generating the spaced initial pulses having any wavelength within the range of 750 nm to 1000 nm. The rod is made of a material having a given storage time. A flash lamp pumps or excites the laser rod by generating a pump pulse having a first duration of about twice the given storage time of the laser rod material. The Q switch in the oscillator cavity causes the rod to generate the two initial, spaced or successive, laser pulses, which are spaced by an interval of time less than the first duration of the flash lamp pump pulse. The injection seeding provisions are coupled to the oscillator cavity to select the wavelength of the two successive laser pulses. A first of the initial successive pulses has a first wavelength, and a second of the initial pulses has a given wavelength differing from the wavelength of the first successive pulse. The first and given wavelengths are within the range of from 750 nm to 1000 nm. A Raman device is provided for double Raman shifting the wavelength of each of the first and second initial successive pulses into the range of from nominally 2 to 6 microns to form the closely spaced output laser pulses.

With these and other features in mind, the present invention relates in general to methods of and apparatus for generating an output laser pulse having any wavelength within a range of 2 to 6 microns. A laser system is provided and includes an oscillator laser cavity with an oscillator rod made of tunable laser material capable of generating an initial light pulse within a tuning range of from 750 to 1000 nm. A Raman device shifts the wavelength of the initial light pulse into an output range of from 2 to 6 microns to form the output laser pulse having a wavelength within the output range. The Raman device is responsive to the initial light pulse to generate radiation at first and second Stokes wavelengths. The output laser pulse is radiation at the second Stokes wavelength. The oscillator rod of the laser cavity is made of tunable laser material capable of generating the initial light pulse within such tuning range of from 750 nm to 1000 nm. A tuning element is also provided in the cavity to tune the cavity. A flashlamp is operable to provide pump light to the rod and a Q-switch controls the output of the oscillator laser cavity.

The present invention also contemplates provision of such Raman device having a cell with H2 medium therein, or alternatively, a Raman device having a cell with H2, deuterium, hydrogen deuteride, or methane medium therein.

The present invention also contemplates methods of and apparatus for generating an output laser pulse in the range of 2 to 6 microns by Raman shifting an initial laser pulse twice, wherein the initial pulse is generated by an oscillator rod fabricated from materials such as Cr:LiSAF, Cr:LiCAF, Ti:SAF, or Cr:LiGdAlF6 according to the desired wavelength of the output laser pulse, wherein a particular one of such materials provides maximum gain at the wavelength selected for the initial laser pulse.

In one embodiment of the present invention, a Raman device includes a cell containing a primary medium and one or more phase-matching gases therein. The primary medium and one or more phase-matching gases have a bulk refractive index vs. wavelength characteristic wherein the values of bulk refractive index corresponding to the wavelengths of initial, first Stokes and second Stokes radiation are substantially co-linear. The primary medium is preferably H2 and one or more phase-matching gases may be selected from CO2, NO2, NH3, and NO.

The present invention also contemplates an oscillator cavity having an injection seeder providing a seeder laser pulse, where the seeder is coupled to the Raman device to propagate the seeder laser pulse through the Raman device to the oscillator rod. The Raman device is normally operated to shift the wavenumber of the initial pulse to a first order Raman shift, but is capable of shifting the wavenumber of the initial light pulse to second order and higher Raman shifts. A second device is coupled to tune the tunable laser material of the oscillator rod so that the initial light pulse has a selected wavelength within a tuning range of from 750 to 1000 nm. The Raman device includes a cell having a selected medium therein, wherein the selected Raman medium has an intrinsic Raman shift. The selected wavelength and the selected medium are effective to energetically forbid the normal shifting of the wavelength of the initial light pulse to the third order and higher Raman shifts because the wavenumber of the second Stokes radiation of the output laser pulse is less than the wavenumber of the intrinsic Raman shift of the selected Raman medium.

The present invention further contemplates such Raman device with the cell containing a mixture of primary medium and one or more phase-matching gases therein. The one or more phase-matching gases have an absorption band at a wavelength longer than the second Stokes wavelength. The mixture includes amounts of the primary medium and the one or more phase-matching gases so that the mixture has a characteristic such that a graph or plot of the bulk refractive index of the mixture against wavelength is a curve having points thereon representing bulk refractive index values corresponding to the wavelengths of initial, first Stokes and second Stokes radiation, where such points are generally on a straight line.

BRIEF DESCRIPTION OF THE DRAWINGS

FIG. 4A is an energy level diagram for generating first and second Stokes pulses by four-wave-mixing Raman shifting in H2.

FIG. 14A is a schematic diagram of an embodiment of apparatus which outputs a double Raman shifted laser pulse at a fixed wavelength within a nominally 2 to 6 micron range according to the present invention.

FIGS. 17A through C are diagrams showing temporal sequences of Q-switching, flashlamp pulsing, output pulse timing and seed wavelength in generating multiple-output pulses nominally in a 2 to 6 micron range.

FIGS. 20, 21A, 21B, 22 and 23 are sequence diagrams illustrating the steps of the various methods of the present invention.

PRIOR ART RAMAN SCATTERING

The present invention uses Raman scattering techniques. As a preface to the following description of the present invention, Raman scattering techniques are discussed in reference to FIG. 2. To conform to the practice in the literature on stimulated Raman scattering, the fundamental laser is referred to as the pump, or the pump laser, and the pump emission is referred to as the pump light. Each vibrational Raman shift in H2 reduces the frequency of the pump light by 4155 $cm^{-1}$. Output light resulting from one Raman shift is called the Stokes or the first Stokes, or the first Stokes pulse. Output light resulting from two Raman shifts is called the second Stokes or the second Stokes pulse. Light shifted up in frequency to shorted wavelengths is called anti-Stokes.

Figure 2:
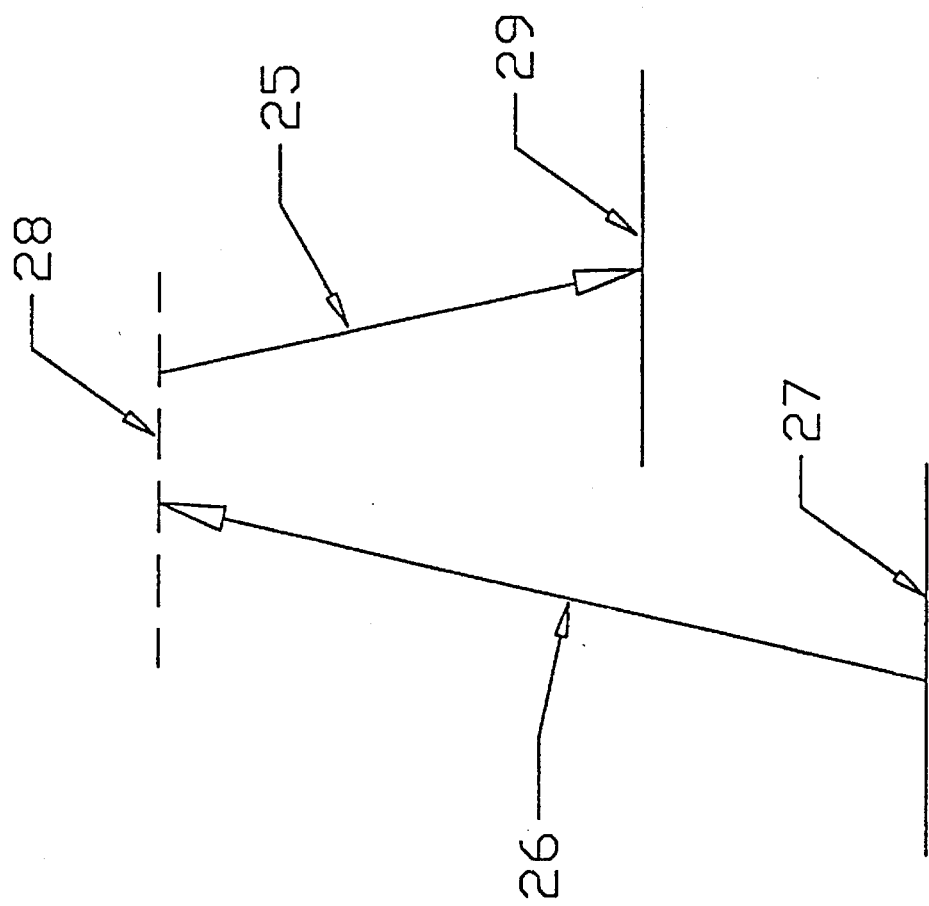
FIG. 2 is an energy level diagram for generating first Stokes emission by Raman shifting in H2.

In more detail, FIG. 2 is an energy level diagram for generating single, or first, Stokes emission, or a first Stokes pulse 25 in H2 medium in a Raman laser (not shown). Pump light 26 is a pulse that drives the H2 molecules into a superposition of a ground state 27 and a small component of an excited virtual level or state 28. The dominant real level to which the pump light 26 couples when generating the virtual level 28 is the electronic state at 10.2 eV. A pump photon at 950 nm has an energy of 1.3 eV so it is far from resonance. The H2 molecule can spontaneously emit and drop from the virtual level 28 into a vibrational level or state 29 located 4155 $cm^{-1}$ above the ground state 27. Spontaneous emission along the pump light 26 stimulates more scattering, and if the interaction is strong enough, depletes most of the pump light 26. The result is the coherent first Stokes pulse 25 with a significant fraction of the pump photons converted to Stokes photons. Photon conversion efficiencies of 80 percent are not uncommon. This effect will occur if, for example, a high power laser pulse is focused near the middle of a Raman cell (not shown) filled with H2 at about 10 atmospheres.

Normally, the phase between the pump light 26 and the first Stokes pulse 25 is not important because the medium is free to select the proper phase to make the pump light 26 scatter and convert to the first Stokes pulse 25. As the first Stokes pulse 25 grows, the medium is driven into a coherent superposition of the ground state 27 and the vibrational state 29. The stimulated Raman process is a coherent interaction between the pump light 26 and the first Stokes pulse 25 and the three levels of the molecule.

As the coherent beating (normally referred to as "Q" for "quadrapole oscillation") between the ground state 27 and the vibrational state 29 grows, the process becomes stronger and eventually depletes the pump light 26. The Q is damped by collisions which randomize the phase of the H2 molecules and thus remove the H2 molecules from the collective coherent oscillation of the medium.

Figure 3:
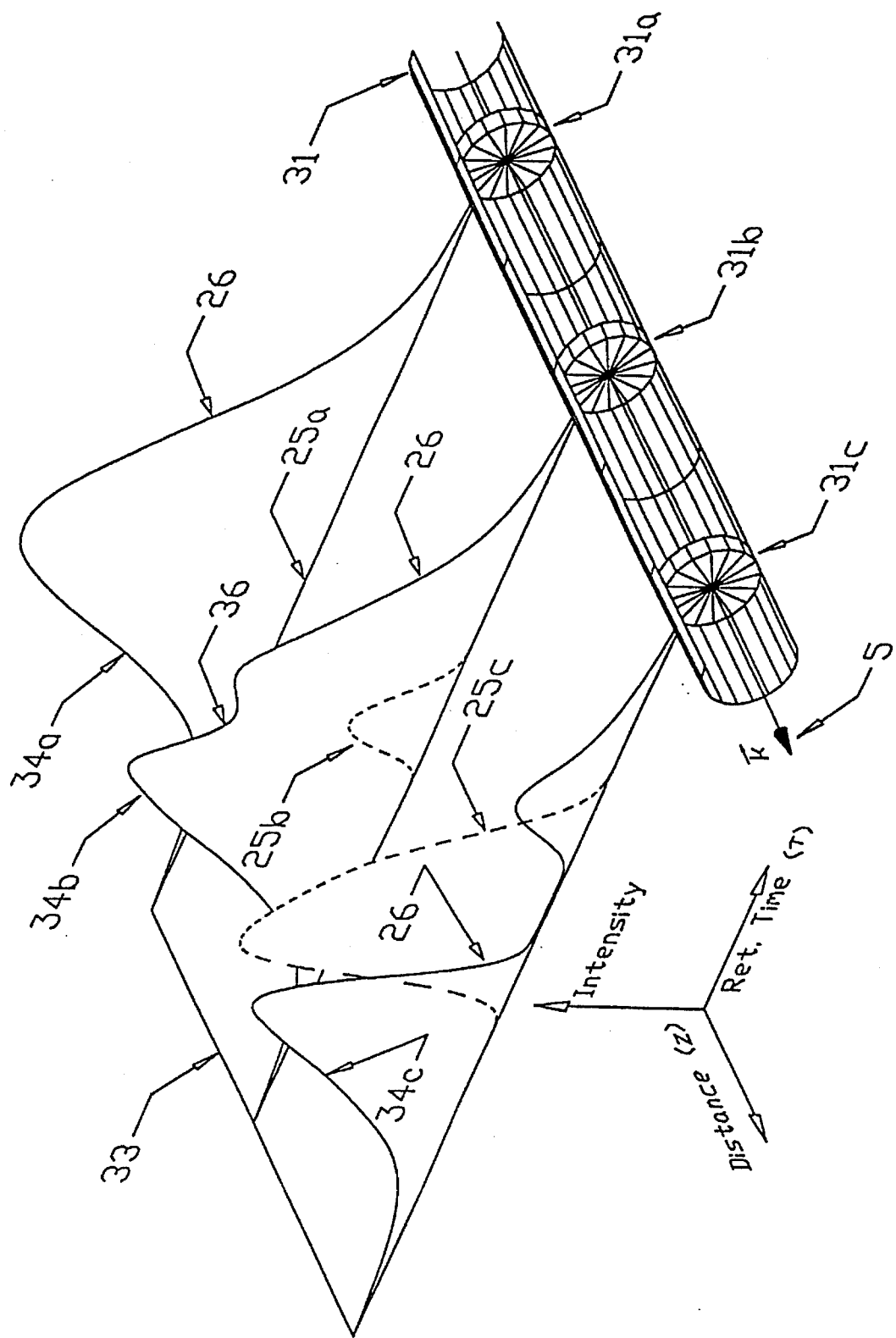
FIG. 3 is a three dimensional depiction of a pump pulse as it is converted to a first Stokes pulse as such pump pulse passes through the Raman medium.

FIG. 3 shows a Raman cell 31 with Raman medium 31 schematically illustrated as a series of thin slices 32 (three slices 32a, 32b, and 32c of the medium are shown). The conversion of the pump light 26 to a first Stokes pulse 25 in successive ones of such thin slices 32 of the Raman medium is depicted by the curves in FIG. 3, which in three dimensions shows light intensity (vertical axis) vs. retarded time (right axis) vs. distance z through the cell (left axis) as the pump light 26 propagates through the slices 32. The solid lines in FIG. 3 represent the intensity of the pump light 26 (in terms of photons per second per area), which propagates in the direction of the z or distance axis. The retarded time (right axis) is defined as tau equals t, the normal time, minus the ratio of z over c, where z is the distance along the medium and c is the speed of light in the medium 32. The retarded time is used because corresponding locations along the light pulses have the same retarded time coordinated at any location in the medium 32. A line 33 represents retarded time equals zero. The temporal profile of the intensity of a pump pulse 34 as it passes through a slice 32a of the medium 31a near the entrance of the cell 31 is shown as a curve 34a. The curve 34a shows the pump pulse 34 having a full intensity profile, indicating that no significant conversion to first Stokes has taken place. After the pump pulse 34 has propagated along the cell 31 Into a slice 32b, the pump pulse 34 is shown as a curve 34b. A portion of the pump pulse 34 has been converted into the first Stokes pulse 25, resulting in a lower intensity portion (or dip) 36 of the pump pulse 34b and the first Stokes pulse 25b having a corresponding increase in intensity represented by a dashed curve 25b. As the pump pulse 34c and the Stokes pulse 25 pass through the third thin slice 32c of the medium the Q builds up and more of the energy of the pump pulse 34 is converted to the first Stokes pulse 25c, until the end of the cell 31 is reached, at which nearly all of a portion of the pump pulse 34 has been converted and the first Stokes pulse 25 has grown to almost the intensity of the pump pulse 34 as shown by the dashed curve 25c.

As the pump light 26 and the first Stokes pulse 25 propagate through the cell 31, a Q is built up in the molecules within a particular slice 32. The collective oscillation of the molecules in the slice 32 is continually damped by collisions between the molecules. Molecules in the slice 32 are continually trying to reach the equilibrium condition where the build up of the Q caused by the pump light 26 is equal to the collisional damping of the polarization. However, because the intensities of the pump light 26 and the first Stokes pulse 25 are not constant, the equilibrium polarization keeps changing. The net result is that the polarization in a slice 32 at one time depends on the intensity of the first Stokes pulse 25 and the pump light 26 at a prior time. This gives rise to the conversion taking place preferentially towards the trailing part of the pump pulse 34. The shift of the Stokes pulse 25 to the trailing part of the pump pulse 34 results from the time for the medium to reach equilibrium.

In single shift Raman wavelength conversion, the phase of the Stokes pulse 25 in relation to the pump light 26 is not important and the Raman medium 31 is therefore not required to have compatible indices of refraction at the two wavelengths. Also, earlier Raman shifting work reported in the literature concentrated on maximizing the conversion efficiency of pump light 26 into first Stokes pulses 25, while minimizing transfer into second Stokes pulses (as described below in respect to FIG. 4) and higher Stokes pulses and anti-Stokes wavelengths (not shown).

DETAILED DESCRIPTION OF THE INVENTION

Raman Scattering in the Present Invention

In the laser pulse generators of the present invention, an opposite approach is taken and, through methods and apparatus described below, in a laser pulse generator 40 maximization of energy transfer to a second Stokes pulse is sought (FIGS. 4 and 14A), while suppressing third and higher Stokes and anti-Stokes light (not shown). In greater detail, an initial laser pulse, or pump pulse, 41 is output by an oscillator laser cavity 42 to a Raman device 43 of the present invention. The initial pulse 41 may have a wavelength tunable in a 750 to 1000 nm nominal pump wavelength band 44. The Raman device 43 is provided with medium 45, such as H2, which Raman shifts the initial pulse 41 to form a first Stokes pulse 46, which has a wavelength tunable from 1.09 to 1.72 microns. The Raman device 43 and the wavelength of the initial laser pulse 41 are selected so that a second Stokes pulse 47 is generated and output from the Raman device 43. The second Stokes pulse 47 is nominally at any wavelength within an output range 48 (FIG. 14A) of 2 to 6 microns.

Second Stokes Generation and Four-Wave-Mixing

The energy level diagram for generation of the second Stokes pulse 47 is shown in FIG. 4. Second Stokes wavelength shifts can be generated by two sequential first Stokes shifting processes. If the process of generating second Stokes radiation is sequential, no relative phase matching between the pump pulse 41, the first Stokes pulse 46, and the second Stokes pulse 47 in the Raman medium 45 is required. However, without phase matching, the conversion efficiency to the chosen output wavelength is generally reduced and a higher power pump laser pulse 41 will be required.

Improved efficiency in the mid-IR range of output pulses 47 is achieved and lower power pump pulses 41 may be used in the present invention by maintaining specific phase matching conditions in the Raman medium 45 between the initial laser pulse 41, the first Stokes pulse 46, and second Stokes pulse 47. This more efficient generation of the desired second Stokes wavelength-shifted output pulse 47 is accomplished by a process referred to as "four-wave-mixing". This results in a much more complete conversion of the energy in the pump pulse 41 to the desired second Stokes pulse 47, and allows the process to begin at lower input powers of the pump pulse 41.

Figure 4B:
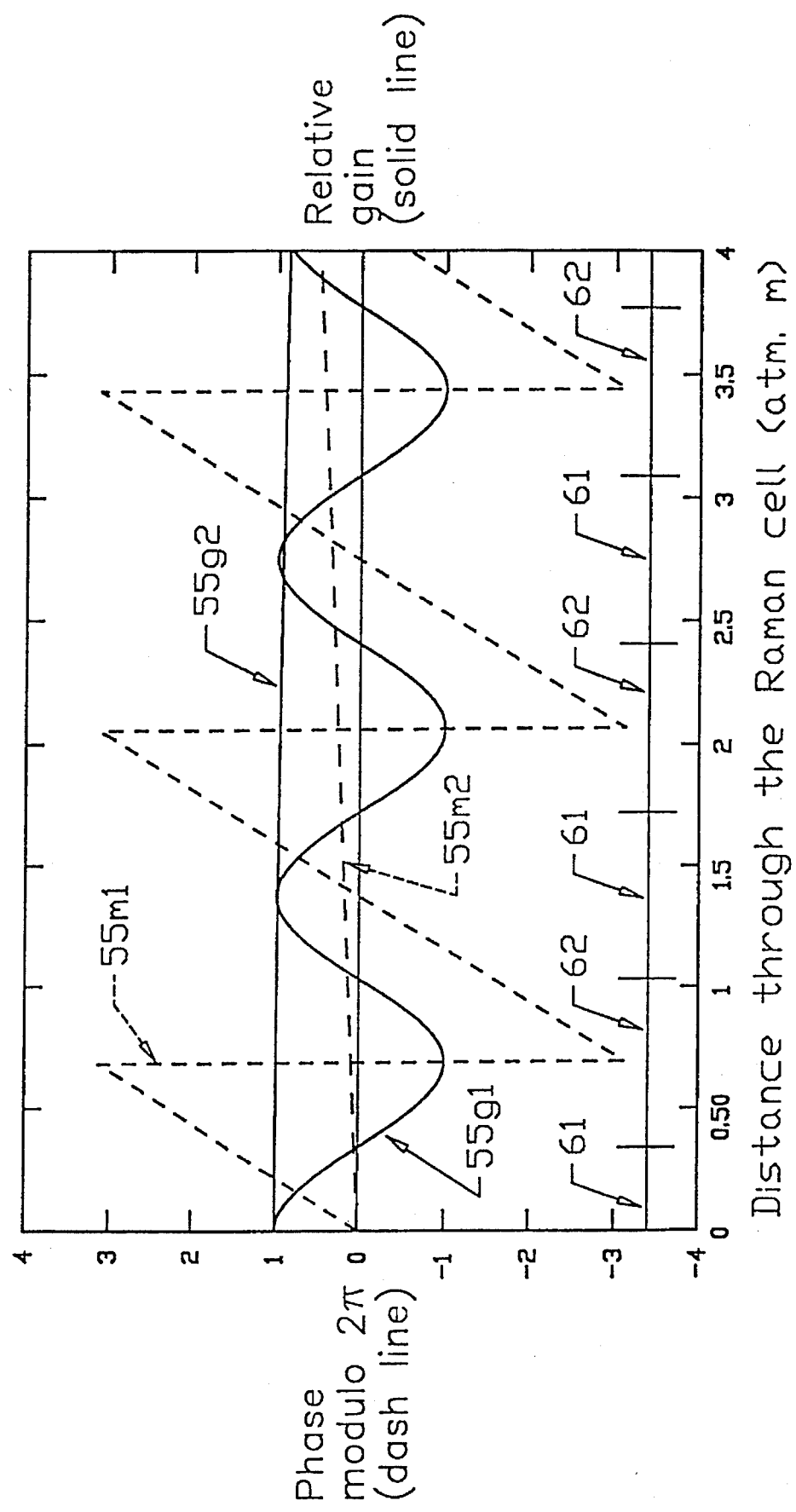
FIG. 4B is a schematic diagram of four-wave-mixing in Raman cells both with and without phase-matching gas in the medium, with phase plotted against the length of a Raman cell (left ordinate), and with the gain of the second Stokes pulse plotted against such length (right ordinate).

When the first Stokes scattering occurs, a Q (not shown) is set up in the medium 45. The Q has a definite phase. This Q beats with the first Stokes pulse 46 to drive the second Stokes pulse 47. Referring to FIG. 4B, differences in the index of refraction of the Raman medium 45 at the three wavelengths (of the pump pulse 41, the first Stokes pulse 46 and the second Stokes pulse 47) can cause the second Stokes pulse 47 to acquire a phase shift relative to the pump pulse 41 and the first Stokes pulse 46. If this happens, the second Stokes pulse 47 can be driven back into the first Stokes pulse 46, significantly decreasing the conversion efficiency to the second Stokes pulse 47.

Applicants have determined that four-wave-mixing is significantly more efficient than sequential first Stokes and second Stokes processes in generating the wavelength-shifted second Stokes output laser pulse 47. Therefore, second Stokes generation in a Raman cell 51 of the Raman device 43 will be most efficient if the proper phase relation between the three pulses (the initial pulse 41, the first Stokes pulse 46 and the second Stokes pulse 47) is maintained from one end 49 (FIG. 14A) of the cell 51 of the Raman device 43 to the other end 52 of the cell 51 to maximize the efficiency of the four-wave-mixing. FIG. 4B shows phase mismatch as a function of distance through the Raman cell 51 and its effect on the gain of the second Stokes pulse 47. A mismatch curve 55m1 shows the second Stokes phase mismatch caused by dispersion in the Raman medium 45, where the medium 45 does not include a "phase-matching" or "index-modifying" gas described below. As the phase mismatch grows, the second Stokes pulse 47 oscillates between growth and depletion as indicated by a first gain curve 55g1. At the end 49 of the cell 51 the second Stokes pulse 47 grows in phase, which is indicated by a gain of 1 in the gain curve 55g1. At a distance of 0.7 atm.-m the second Stokes pulse 47 has a acquired a full two pi phase (curve 55m1) and the second Stokes gain is again 1 (curve 55g1). This is not an efficient way to generate second Stokes pulses 47.

Curve 55m2 shows the phase mismatch for a nearly index-matched Raman medium 45 which includes such phase-matching or index-modifying gas described below. Curve 55g2 is the relative gain resulting from the phase mismatch. In practice there will be at least a small error when mixing an index-modifying gas to form the medium 45. For curves 55m2 and 55g2, this error is 0.5 radians in a 4 atm. meter cell 51, showing that index matching to 0.5 radians in the length of the medium 45 results in only a small decrease in the second Stokes gain. An example of the length of the cell 51 is twice the Rayleigh range.

Phase (or Index) Matching the Four-Wave-Mixing Process

The foregoing proper phase relationship is referred to as "phase matching". The phase matching requirements to achieve efficient generation of the second Stokes pulse 47 with the nominal 2 to 6 micron range 48 have been determined by computer modelling using H2 and small amounts of other phase-matching gases as the gases forming the medium 45. Such other gases modify the bulk index of refraction of the medium 45 to meet the phase matching requirements for efficiently driving the four-wave mixing wavelength conversion process. To facilitate the description of phase matching, FIGS. 5 through 8 and 11 depict how such index of refraction varies with wavelength for various Raman medium 45. Further, FIGS. 9, 10, 12 and 13 depict phase mismatch in terms of total phase difference through a four atm.-meter interaction length.

Referring to FIG. 14A, the phase relation between such three pulses 41, 46 and 47 may be understood. Such phase difference shown by the curves in FIGS. 9, 10, 12 and 13 for double Raman conversion over a cell 51 having a length z is given by:

$$\Delta\phi = (k_p n_p + k_{ss} n_{ss} - 2k_s n_s) \cdot z \qquad (1)$$

where k is the wavenumber in vacuum, n is the refractive index, and the subscripts p, s, and ss denote these quantities evaluated at the wavelengths of the pump pulse 41, the Stokes pulse 46, and second Stokes pulse 47, respectively. Conservation of energy requires that:

$$\frac{h}{2\pi} \cdot (w_p + w_{ss} - 2w_s) = 0 \qquad \text{Eq 2}$$

where h is Planck's constant and w is the angular frequency evaluated at the wavelengths of the respective pulses 41, 46 and 47. If the refractive index of the Raman medium 45 varies linearly with wavelength, regardless of the slope or intercept, then Equation 1 will give a phase difference of zero under the restriction of Equation 2, indicating that the phases of the pulses 41, 46 and 47 are matched. Stated differently, the phase matching criteria (for efficiently driving the four-wave mixing process to generate the second Stokes pulse 47) is that the bulk refractive index values of the Raman medium 45 at the particular wavelength of each of the initial pulse 41, the first Stokes pulse 46, and the second Stokes pulse 47 should be co-linear, that is, they should fall on a common straight line, such as the line 53 (see FIG. 6) when plotted against wavelength. Such straight line relationship of such refractive index values vs. wavelength is now described in more detail with respect to FIGS. 5 through 13.

Refractive Index Analysis

Figure 5:
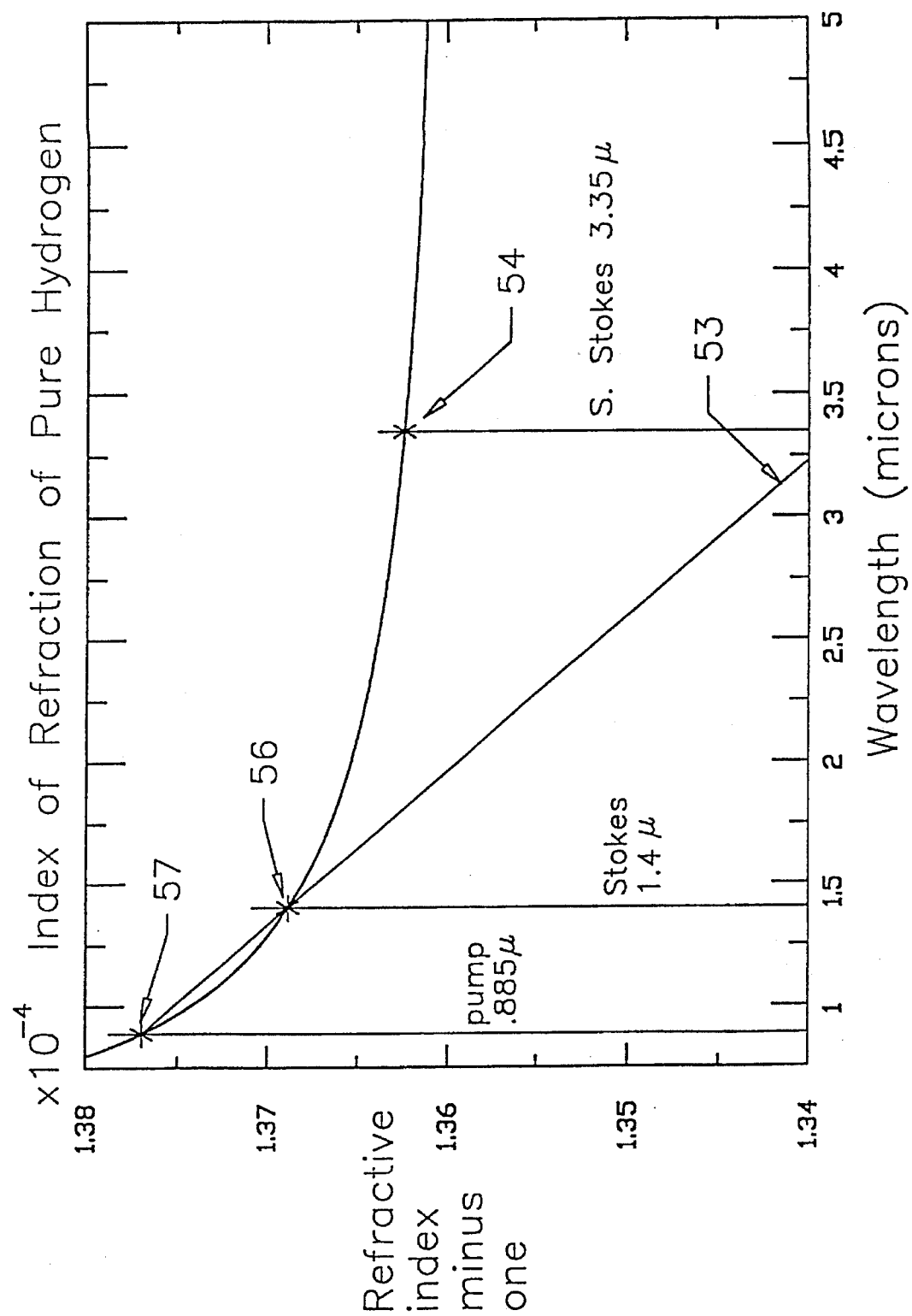
FIG. 5 is a graph depicting the refractive index of H2 in a Raman cell as a function of wavelength, with positions or points marked to represent the refractive index corresponding to the wavelengths of a pump pulse, a first Stokes pulse, and a second Stokes pulse in generating a 3.35 micron second Stokes output laser pulse.

The graph of FIG. 5 shows the refractive index of H2 medium 45 plotted as a function of wavelength. Points on the graph represent the respective wavelengths of the pump pulse 41, the first Stokes pulse 46, and the Second Stokes pulse 47. In the example shown in FIG. 5, a point 54 represents the index of refraction of the second Stokes output pulse 47 having a wavelength of 3.35 microns. A point 56 represents the index of refraction of the first pulse 46 having a wavelength of 1.4 microns. A point 57 represents the index of refraction of the initial pulse 41 having a wavelength of 885 nm. The points 54, 56, and 57 are definitely not co-linear, in that they do not fall on the same straight line 53. Rather, there is a total phase difference of over 18 radians through 4 atm.-meters of gas (FIG. 8), whereas for phase matching it is desirable to keep the total phase mismatch to less than 1 radian. For this case, there are three regions 61 (FIG. 4B) in the cell 51 amplifying the second Stokes pulse 47 and three regions 62 depleting the second Stokes pulse 47. Analysis indicates that with H2 alone as the medium 45, the four-wave-mixing process is well phase matched over only about a 2 cm long path from one end 49 of the cell 51 to the other end 52.

In an embodiment of the present invention, as illustrated in FIGS. 6 through 9, for example, another gas having an absorption resonance band below the second Stokes wavelength is mixed with the H2 medium 45. In this manner, the bulk gas refractive index at the wavelength of the second Stokes pulse 47 is selectively changed to the desired straight line relationship illustrated by the straight line 53 which points 54, 56 and 57 intersect. With such straight line relationship, the four-wave-mixing process is phase matched along the entire length (4 atm.-meters) from the one end 49 of the cell to the other end 52 of the cell 51 and the resulting gain corresponds to curve 55g2 in FIG. 4B. Because the index of refraction of H2 is quite small compared to that of other gases, such mixing may be used to select the values of the bulk gas refractive index to achieve such straight line relationship. Evaluation of gases for possible use as such added index-modifier gases may be made by generating refractive index data using infrared transition data from the HITRAN database and employing the Kramers-Kronig relations. All calculations presented below use 4 atm.-meters of H2 which is appropriate for the Raman shifting cell 51 in the described embodiments. For example, such evaluation resulted in the selection of the following index-modifier gases for output laser pulses 47 at 2.0 microns, 3.35 microns, 4.5 microns, and 6.0 microns.

Phase Matching At 2.0 Microns: Mixture of CO2 and H2 As Medium 45

Mixing 37% of CO2 with H2 to form the medium 45 in the Raman cell 51 phase matches the four-wave-mixing process at 2 microns. The index curves for this specific wavelength have the feature of the above-referenced straight line relationship. The following analysis for 3.35 and 4.5 microns teaches the technique used to determine the required concentrations and the physics involved in the 2.0 micron example.

Phase Matching at 3.35 Microns: Mixture of CO2 and H2 As Medium 45

Figure 6:
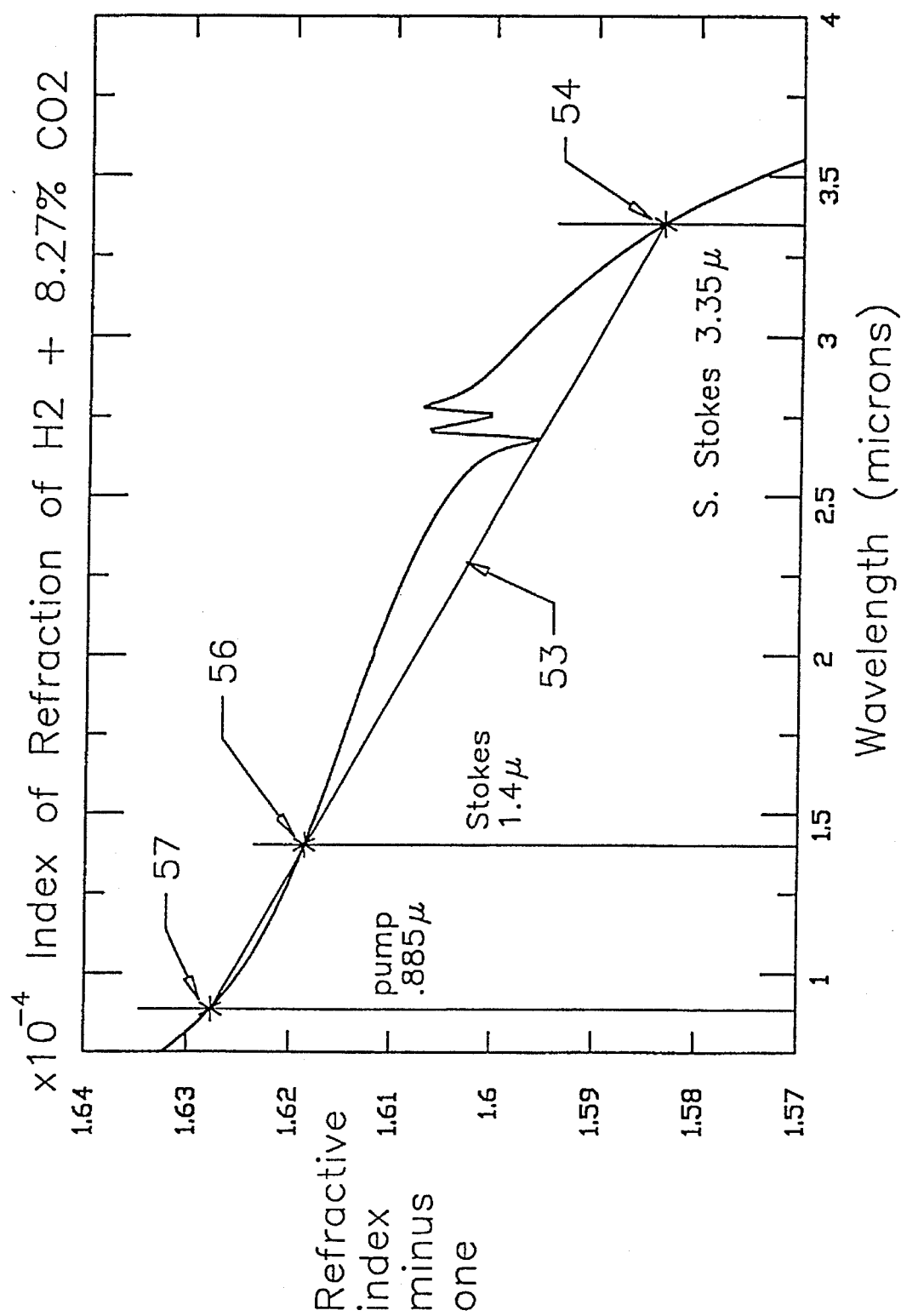
FIG. 6 is a graph depicting the bulk refractive index of an H2 Raman cell containing 8.27% carbon dioxide ($CO_2$) as a function of wavelength, with positions or points marked to represent the refractive index corresponding to the wavelengths of the pump pulse, the first Stokes pulse, and the second Stokes pulse in generating a 3.35 micron second Stokes output laser pulse.

Mixing 8.27% of CO2 with H2 to form the medium 45 in the Raman cell 51 phase matches the four-wave-mixing process at 3.35 microns. The resulting bulk or combined index of refraction is shown in FIG. 6. To illustrate the benefit of phase matching in another manner, the data in FIG. 6 has been replotted in FIG. 9 to show the phase mismatch instead of the index of refraction. Referring also to FIG. 14A, phase mismatch of the medium 45 at the one end 49 of the cell 51 with the medium 45 at the other end 52 of the cell 51 can reverse the scattering direction. If the phase difference from a center 58 of the cell 51 to one of the ends 49 or 52 is less than about half a radian, then the gain will still be near its maximum.

Figure 9:
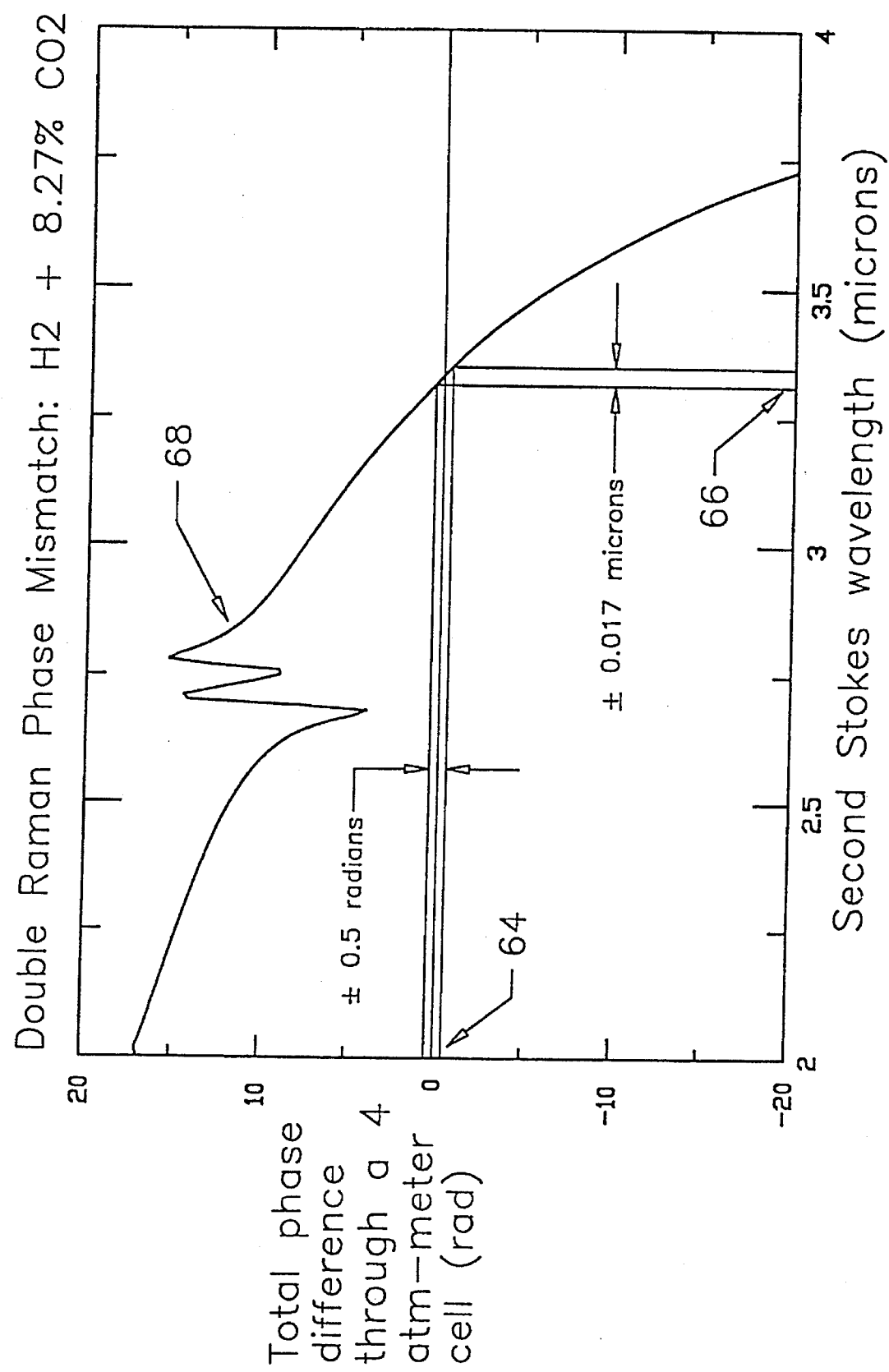
FIG. 9 is a graph depicting the phase mismatch as a function of wavelength for the $CO_2$ and H2 Raman cell of FIG. 6.

The phase mismatch as a function of wavelength is shown in FIG. 9 using the mixture of 8.27% CO2 and H2 as the medium 45 in the cell 51. While a comparatively small amount of CO2 is necessary to correct the phase mismatch, such percent of CO2 only gives a narrow band of good performance. For example, an acceptable phase mismatch range 64 from zero total phase difference is within a phase mismatch of plus or minus 0.5 radians. With the phase mismatch curve in FIG. 9 for 8.27% CO2 in H2, as the medium 45, sufficient phase matching can be maintained over a nominal wavelength range 66 of 0.034 microns of the output laser pulse 47.

Mixture of NH3 and H2 As Medium 45

Figure 7:
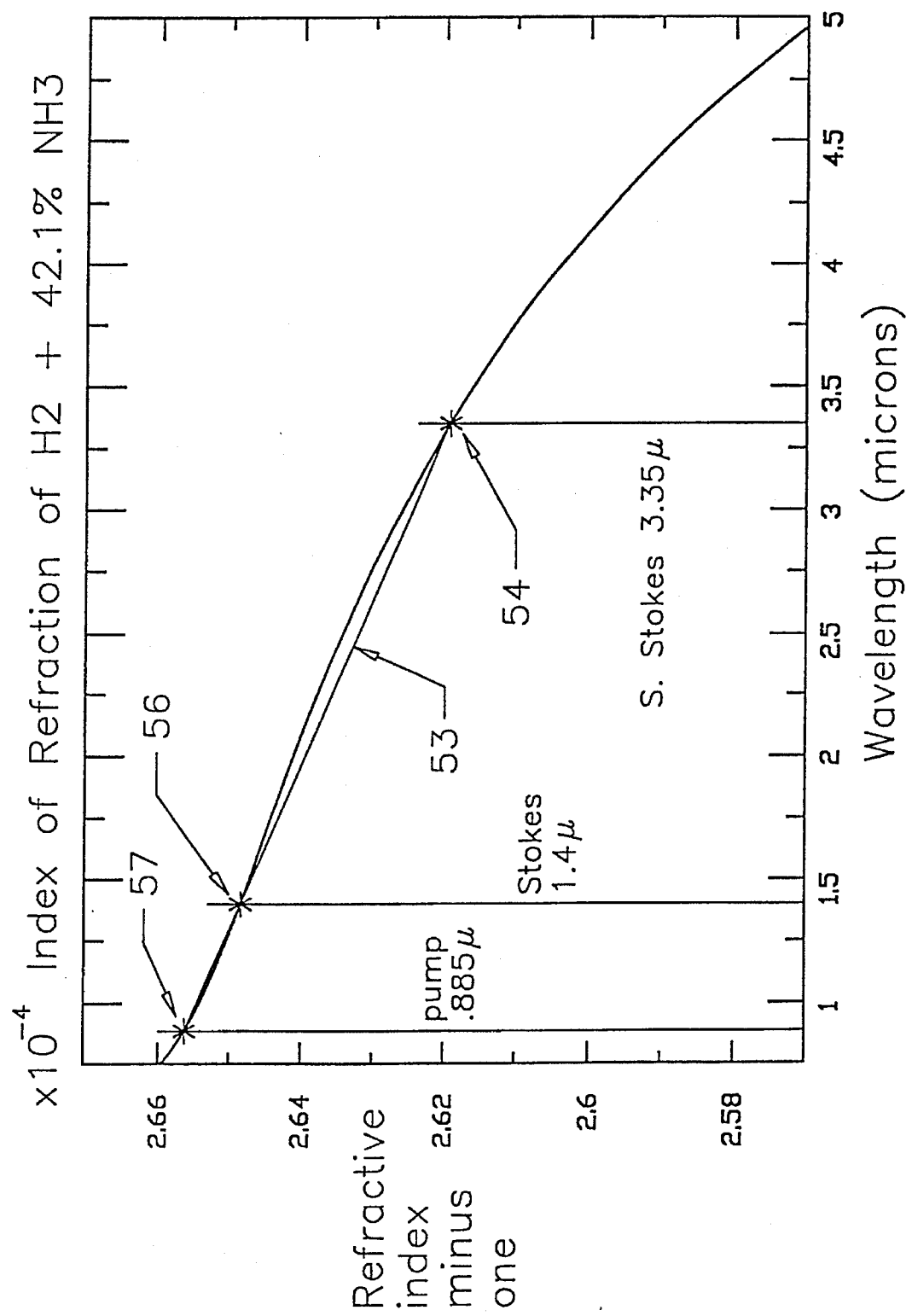
FIG. 7 is a graph depicting the refractive index of an H2 Raman cell containing 42.1% ammonia ($NH_3$) as a function of wavelength, with points marked to represent the refractive index corresponding to the wavelengths of the pump pulse, the first Stokes pulse, and the second Stokes pulse used for generating a 3.35 micron second Stokes output laser pulse.
Figure 8:
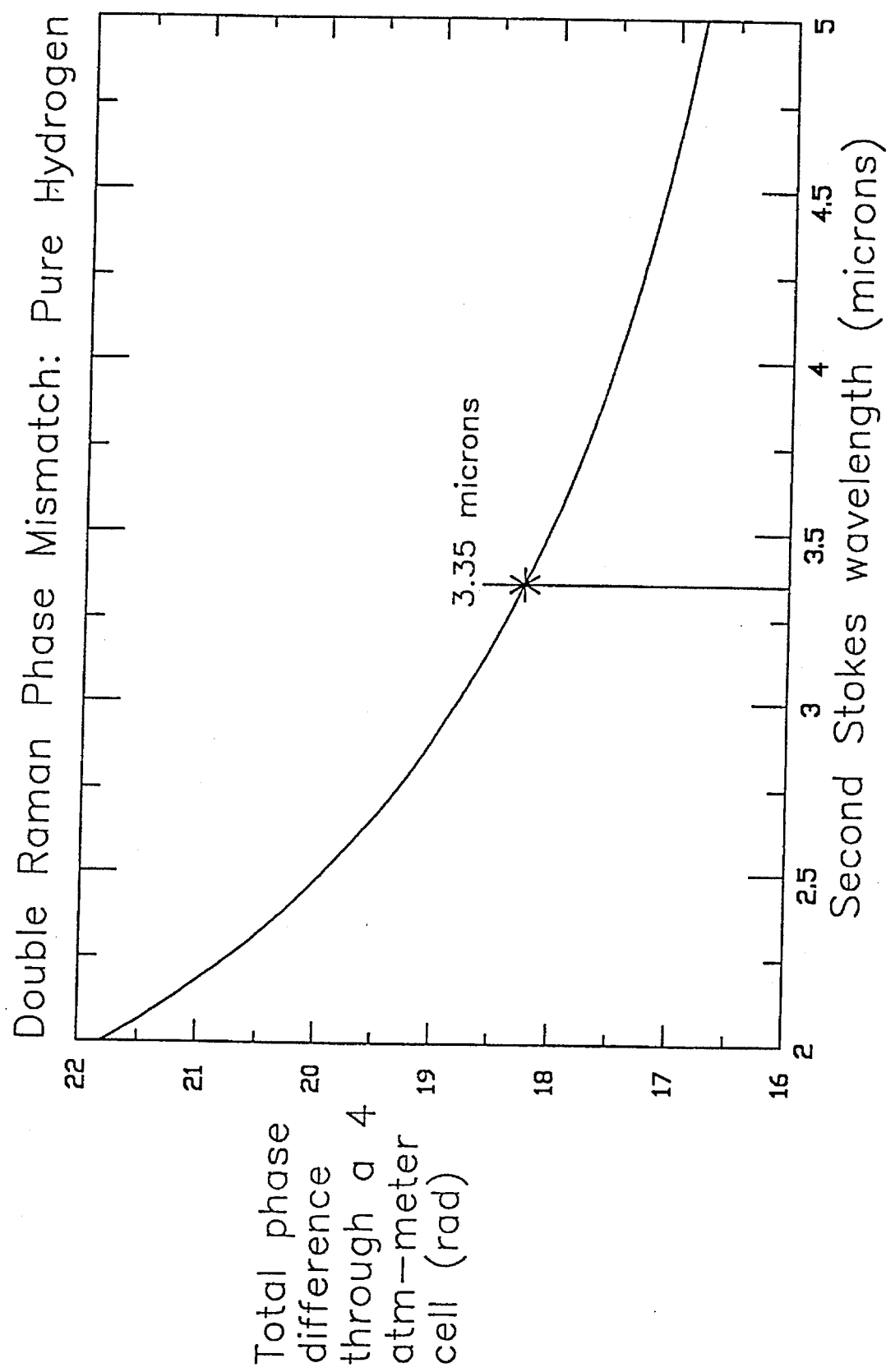
FIG. 8 is a graph depicting the phase mismatch as a function of wavelength for the H2-filled Raman cell of FIG. 5.

The addition of NH3 also phase matches the four-wave-mixing process at 3.35 microns as shown in FIG. 7. Although the large 42.1% concentration increases the collisional damping rate (thereby reducing the Raman gain), there are benefits to the use of NH3. For example, in FIG. 7 the bulk refractive index curve is smoother over wavelength as compared to the curve in FIG. 6. Thus the four-wave-mixing process with NH3 and H2 remains optimal over a wider wavelength phase-matched (or tuning) band or range 66 (e.g., 0.14 nm in FIG. 10) which extends away from the selected 3.35 micron center because the wavelength of the second Stokes pulse 47 may be tuned (as described below).

Figure 10:
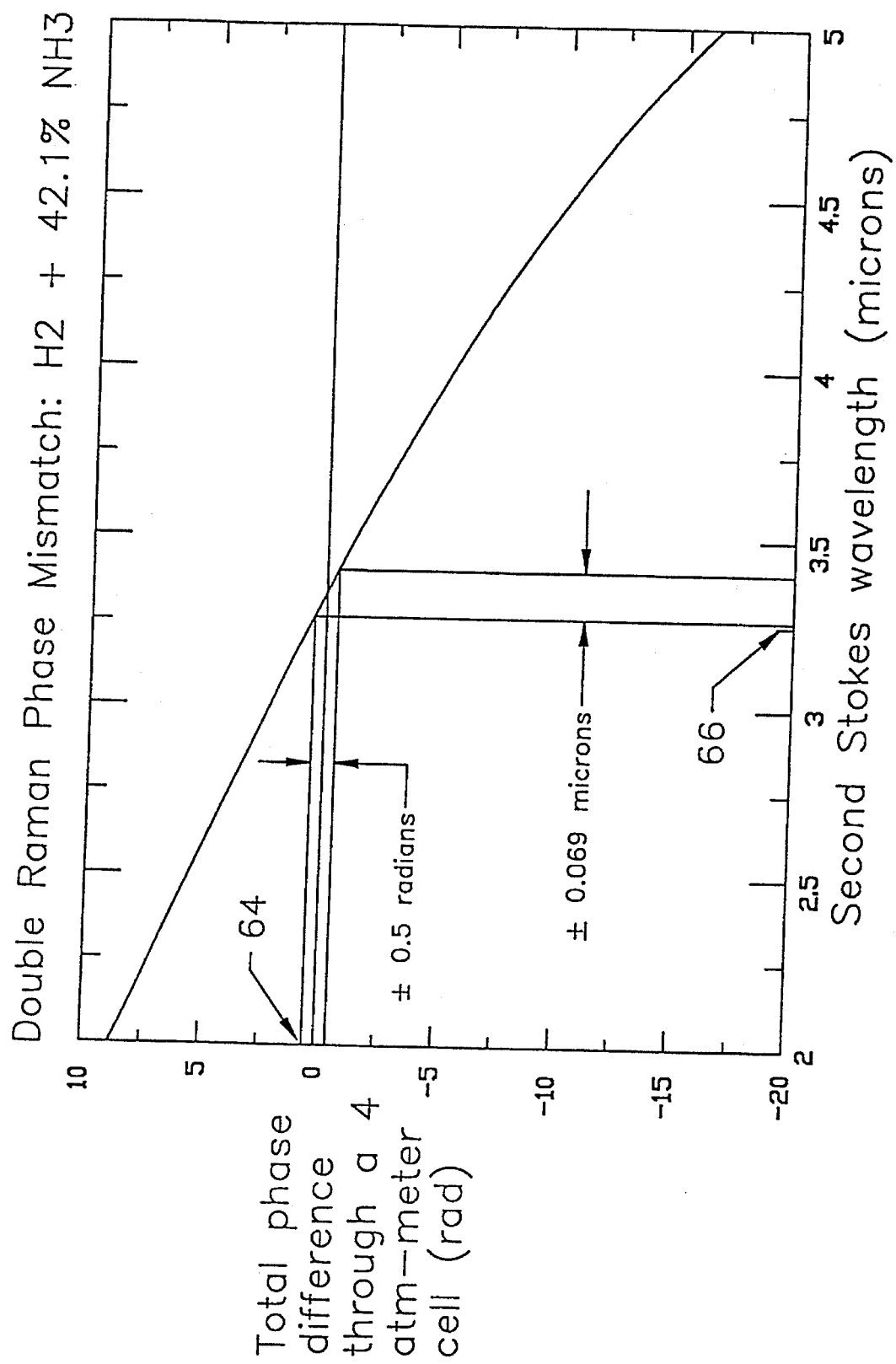
FIG. 10 is a graph depicting the phase mismatch as a function of wavelength for the $NH_3$ and H2 Raman cell of FIG. 7.

The phase mismatch as a function of wavelength is shown in FIG. 10 for the cell 51 having 42.1% NH3 and 57.9% H2 as the medium 45. As shown in FIG. 10, the phase difference curve is flatter for NH3 than for CO2, which enables NH3 to provide phase matching over a larger band 66 of wavelength of the output pulse 47. In particular, when using NH3 as the phase matching gas, acceptable phase matching is maintained over the band 66 having a nominal 0.14 micron width, such that the wavelength of the output laser pulse 47 may be tuned because the refractive index is more strongly altered, which occurs near a transition like 68 (FIG. 9), though in the more nonlinear fashion shown in FIG. 6, (i.e., the slope is greater at 3.3 microns in FIG. 9 (CO2) than in FIG. 10 (NH3). The transition which dominates the index of refraction curve is off the long wavelength edge of FIGS. 6, 7 and 11 and not the weak transition 68.

Phase Matching at 4.5 Microns

Figure 11:
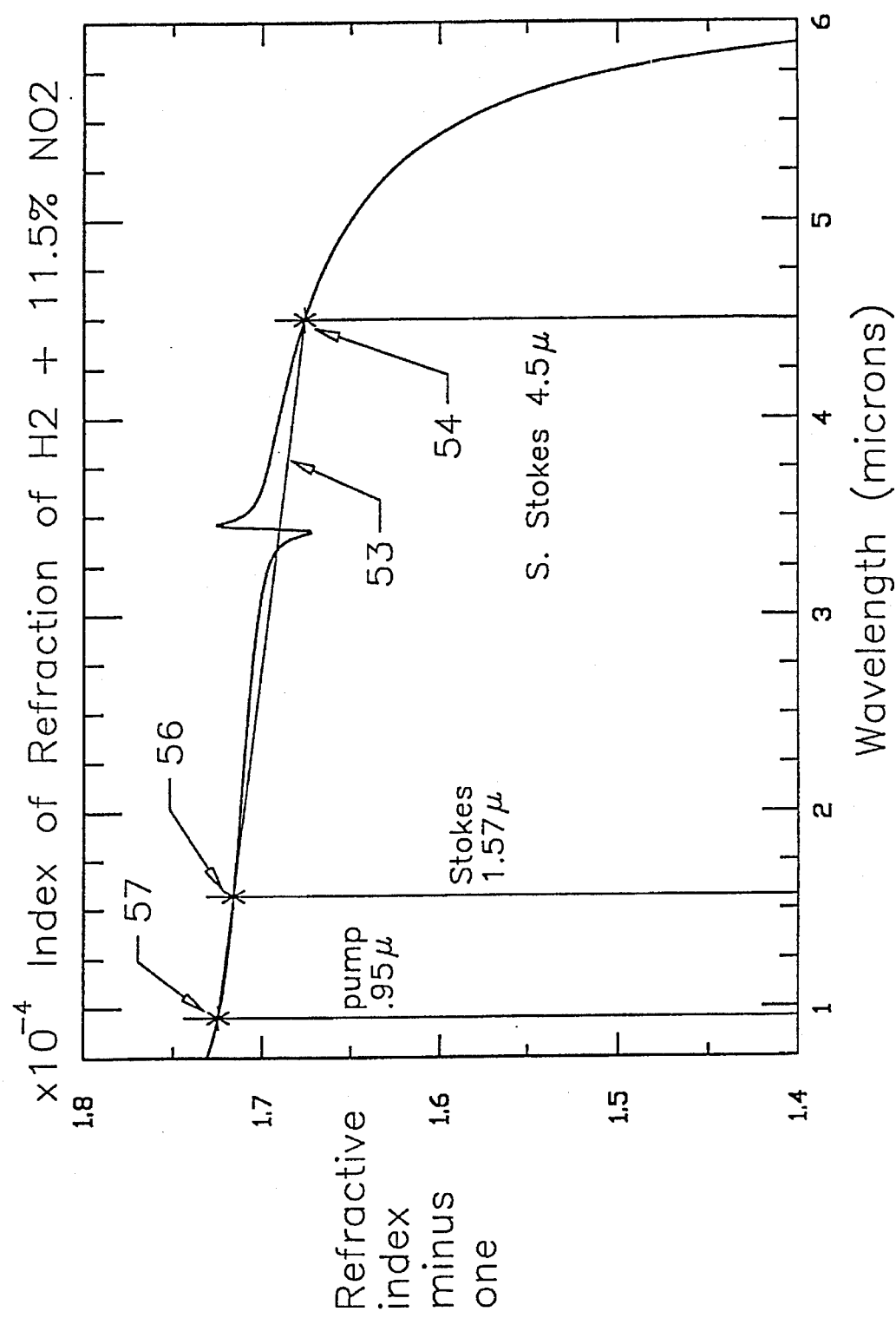
FIG. 11 is a graph depicting the refractive index of an H2 Raman cell containing 11.5% nitrogen dioxide ($NO_2$) as a function of wavelength, with points marked to represent the refractive index corresponding to the wavelengths of the pump pulse, the first Stokes pulse, and the second Stokes pulse used for generating a 4.5 micron second Stokes output laser pulse.
Figure 12:
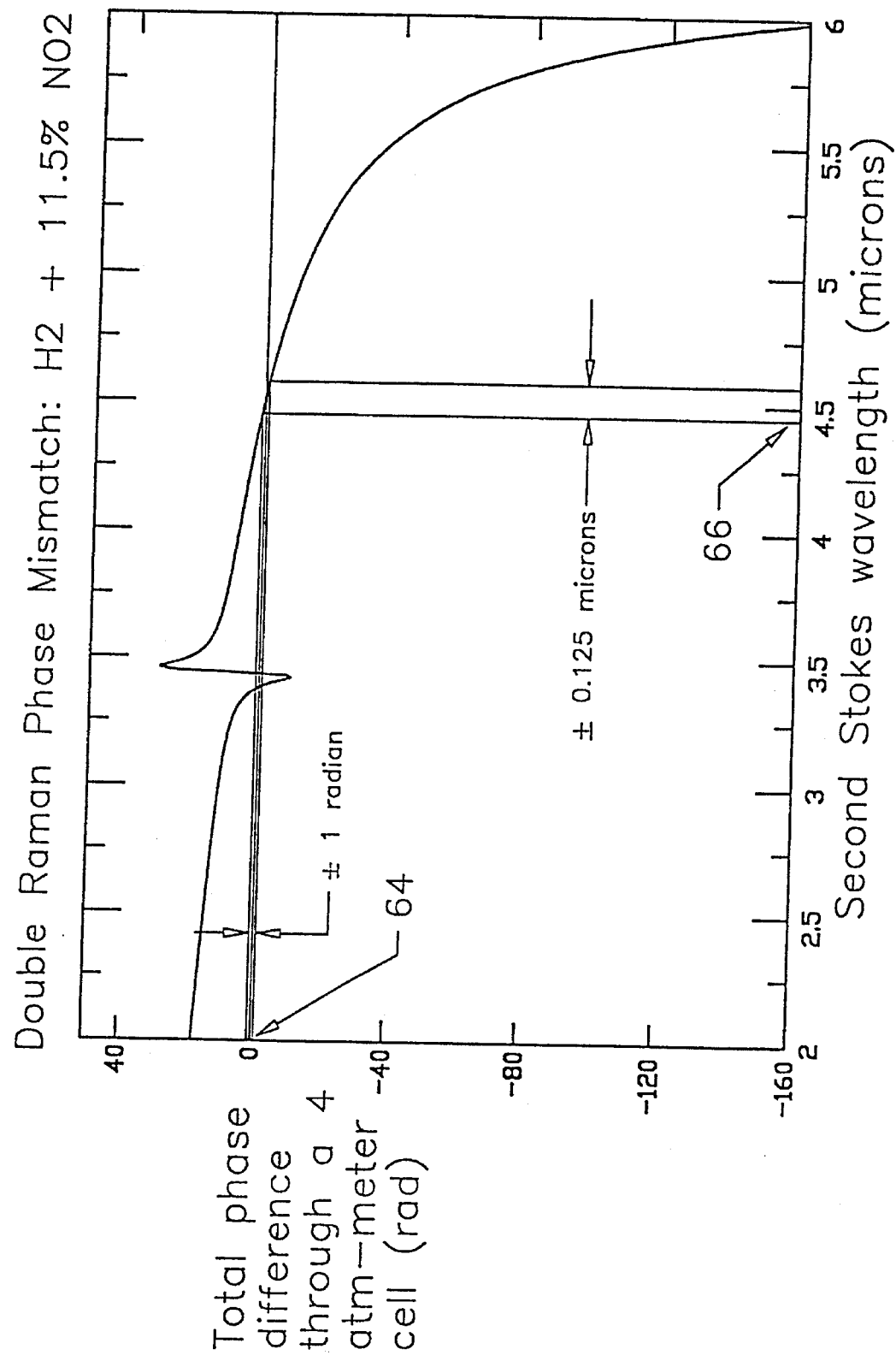
FIG. 12 is a graph depicting the phase mismatch as function of wavelength for the $NO_2$ and H2 Raman cell of FIG. 11.
Figure 13:
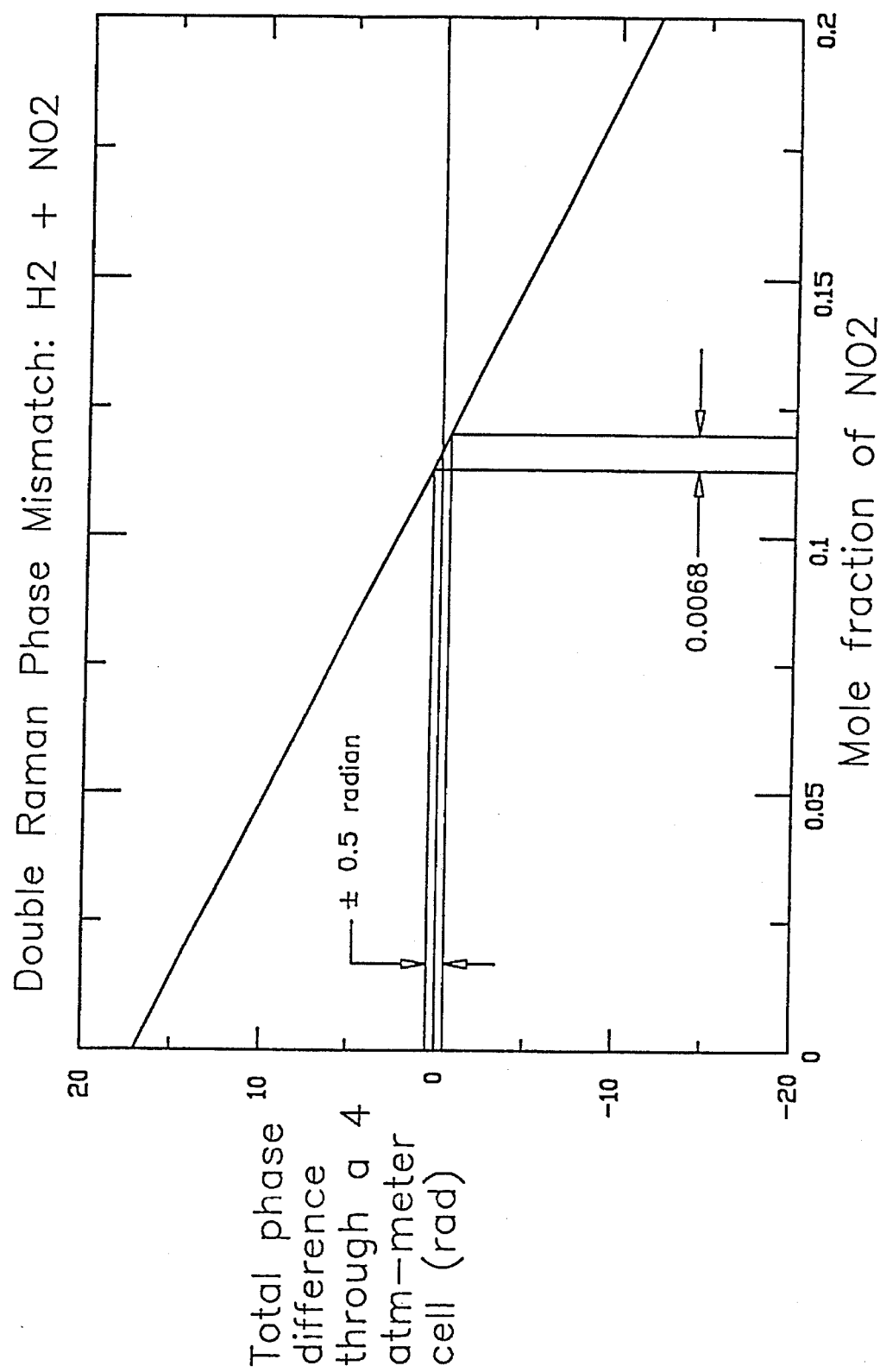
FIG. 13 is a graph depicting the phase mismatch as a function of $NO_2$ content for the Raman cell of FIG. 11.

Using the method described above, two phase matching gases may be used as embodiments for generation of 4.5 micron second Stokes pulses 47. In particular, 11.5% of NO2 or 48.5% of NO provides phase matching. The lower concentration of NO2 is preferred to reduce collisional damping. The index of refraction of 11.5% NO2 in H2 is shown in FIG. 11, and the phase mismatch as a function of wavelength is shown in FIG. 12. The phase matched band 66 with the given NO2 concentration of 11.5% is about 0.2 microns. The phase mismatch as a function of NO2 concentration is shown in FIG. 13. The concentration must be controlled to a few tenths of a percent to achieve the acceptable phase matching.

Phase Matching At 6.0 Microns

Two possible gases can be used for phase matching to generate 6 micron second Stokes output pulses 47, e.g., either 37% NH3 or 1% NO2 can be used. With 1% NO2 the phase matching band is very small compared to NH3. The required concentration of NO2 increases rapidly as the output wavelength is shortened to the 11.5% value needed at 4.5 microns.

In the embodiments described, phase matching via the use of an index-modifier gas (or a plurality of such gases) is an important way of increasing efficiency of conversion of the input initial pulse 41 to the second Stokes pulse 47. To maintain maximum efficiency, the concentration of the gas in the medium should be adjusted if the wavelength of the output laser pulse 47 is tuned by more than about 0.1 microns.

Once the phase of the medium 45 has been picked, the relative phase between the pump light 41, the first Stokes pulse 46, and the second Stokes pulse 47 should be maintained for best gain. Due to collisional damping the medium 45 can respond to slow changes in the relative phase with little effect on the gain.

Other Gases For the Medium 45

Hydrogen deuteride has an intrinsic Raman shift of 3628 cm$^{-1}$, deuterium has an intrinsic Raman shift of 2991 cm$^{-1}$, and methane has an intrinsic Raman shift of 2916 cm-1. These gases are useful in generating double-Raman shifts smaller than the intrinsic Raman shift of 4155 cm$^{-1}$ of H2. For example, a Raman device 43 filled with deuterium will double-Raman shift the Cr:LiSAF tuning band 44 of 750 nm to 1000 nm to infrared wavelengths of from 1.36 microns to 2.49 microns. These gases other than H2 may be selected and used according to the same principles as described above for H2. These gases have absorption bands at wavelengths just longer than the second Stokes wavelength.

Energetically Forbidding Third and Higher Stokes Radiation

Apart from phase matching, increases are achieved in the efficiency of conversion of the initial pulse 41 to the second Stokes pulse 47 by not allowing third and higher Stokes radiation to significantly occur. In particular, in many embodiments of the present invention the parameters of the Raman device 43 are selected so that third and higher Stokes orders are energetically forbidden. For example, if H2 is the medium 45 in the Raman cell 51, the fundamental Raman shift intrinsic to H2 is a wavenumber shift of 4155 cm$^{-1}$. If the initial laser pulse 41 is at 900 nm (or a wavenumber of 11,111.11 cm$^{-1}$), then the first Raman shift in hydrogen will be to (11,111.11 cm$^{-1}$–4155 cm$^{-1}$)=6956.11 cm$^{-1}$. This corresponds to 1.437 microns. The second Raman shift in H2 will be to (6956.11 cm$^{-1}$–4155 cm$^{-1}$)=2801.11 cm$^{-1}$, corresponding to 3.570 microns, which is within the design output wavelength of the second Stokes pulse 47. If a third Raman shift were to occur, it would be to (2801.11 cm$^{-1}$–4155 cm$^{-1}$)=–1353.89 cm$^-$. This is physically impossible since the negative wavenumber implies a negative photon energy in the third shift. In other words, the third Raman shift from 2801.11 cm$^{-1}$ cannot occur in H2 since the second Raman shifted photon has less energy than the intrinsic Raman shift in H2. The third Raman shift is said to be "energetically forbidden" under these conditions. This is a desirable and specifically sought condition in the Raman cell 51 which maximizes the photon transfer to the second Raman shift wavelength, while eliminating higher order Raman shifts to stop the energy cascade at the design wavelength.

With the 900 nm initial pulse 41 in mind, it may be understood that a third Raman shift is not allowed in the Raman device when the wavelength of the initial pulse 41 is longer than 802 nm because at this wavelength the second Stokes photon energy becomes less than that of the intrinsic Raman shift in hydrogen. In summary, with the above-described phase matching of only the three pulses 41, 46, and 47, the anti-Stokes shifted light is minimized by a lack of phase matching. The elimination of the competing third Stokes process via selection of the wavelength of the initial pulse 41 (to be above 802 nm), and the minimization of the anti-Stokes process, are a significant benefit because the photons then accumulate at the desired second Stokes wavelength, resulting in high conversion efficiency to the 2 to 6 micron output laser pulse 47. Such selected wavelength (e.g., 802 nm) has a value such that the intrinsic shift of the wavelength of the initial light pulse 41 to the third Stokes order results in a third Stokes wavelength of such length that the Raman device 43 diffracts the third stokes radiation away from an intense focus region before depleting significant energy from the second Stokes radiation 47.

Laser Pulse Generators 40 and 70

Figure 14B:
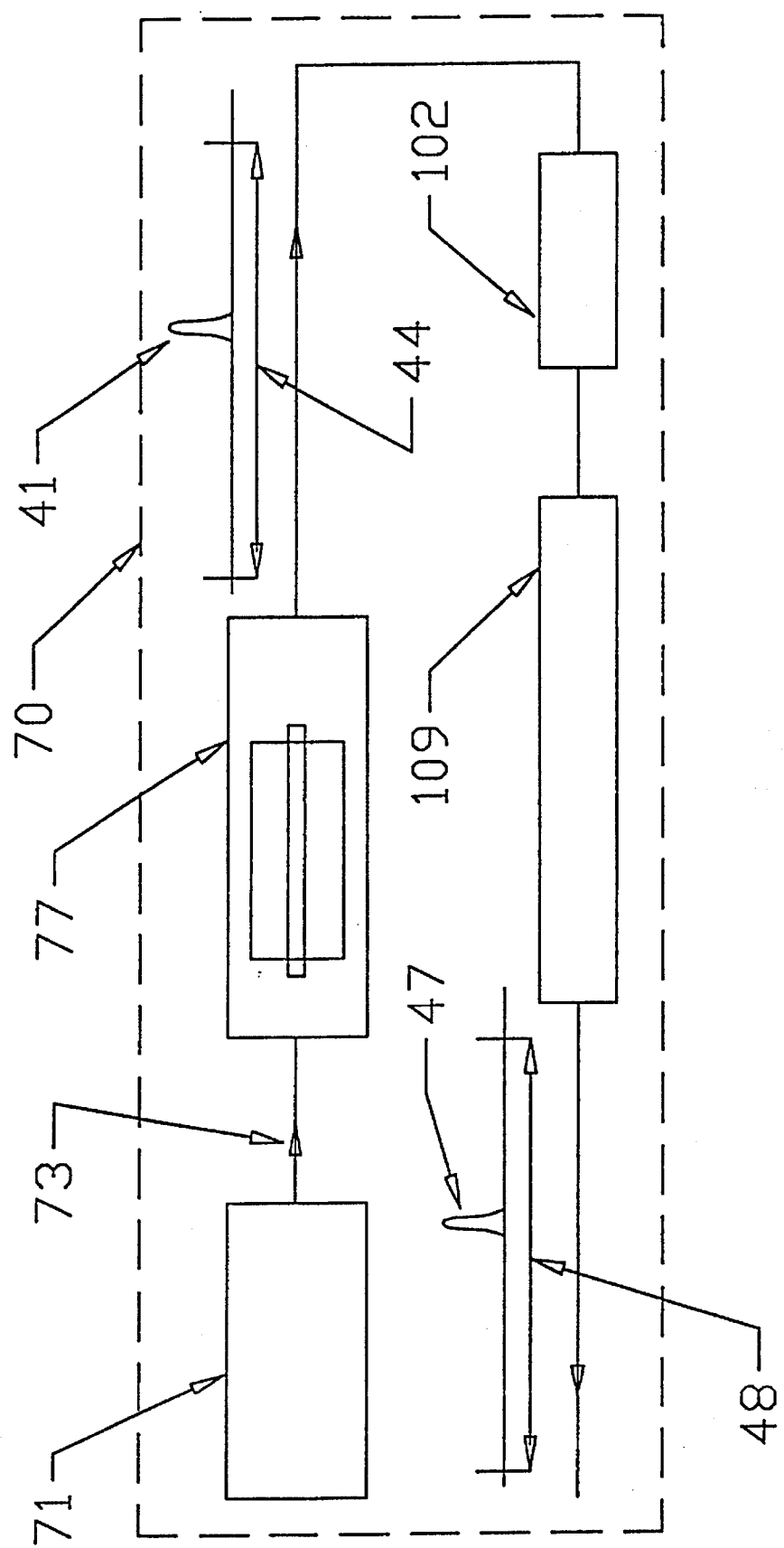
FIG. 14B is a schematic diagram of another embodiment of apparatus which outputs a tunable, double Raman shifted laser pulse at any wavelength within a nominally 2 to 6 micron range according to the present invention.
Figure 14C:
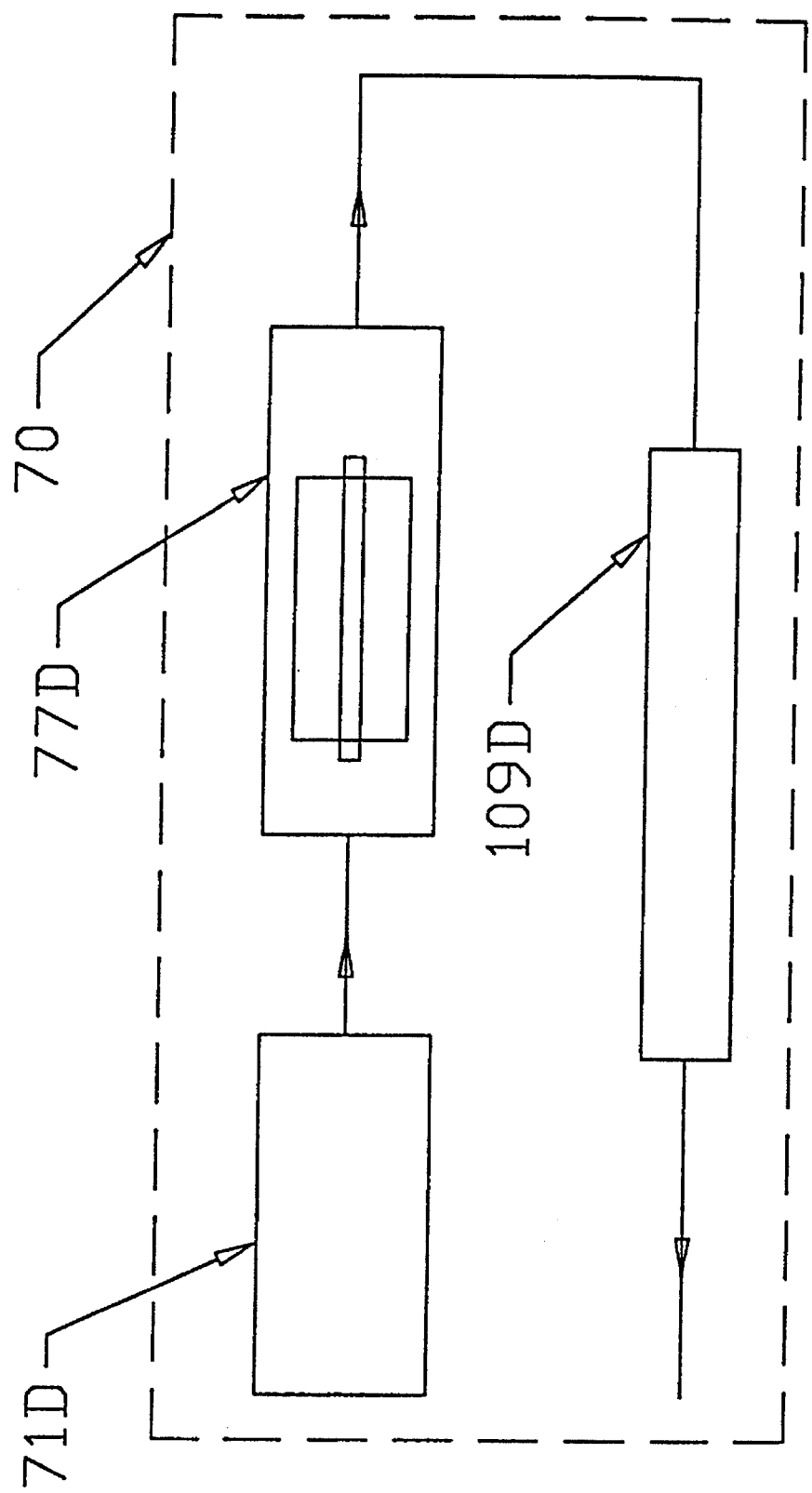
FIG. 14C is a schematic diagram of another embodiment of apparatus which outputs a tunable, double Raman shifted laser pulse at a fixed wavelength within a nominally 2 to 6 micron range according to the present invention, wherein due to efficiencies resulting from phase matching of pulses in a Raman device no amplification of such pulses is necessary.

Laser pulse generators of the present invention are provided with a laser oscillator cavity, such as the cavity 42 of the generator 40 shown in FIG. 14A, and the Raman device 43. The generator 40 is designed to output the second Stokes output pulse 47 at a given wavelength in the output range 48. Another embodiment of the laser generator of the present invention, a laser pulse generator 70 (FIGS. 14B and 15A), is tunable to provide the second Stokes output pulse 47 having any wavelength in the output range 48 of 2 to 6 microns.

Figure 15A:
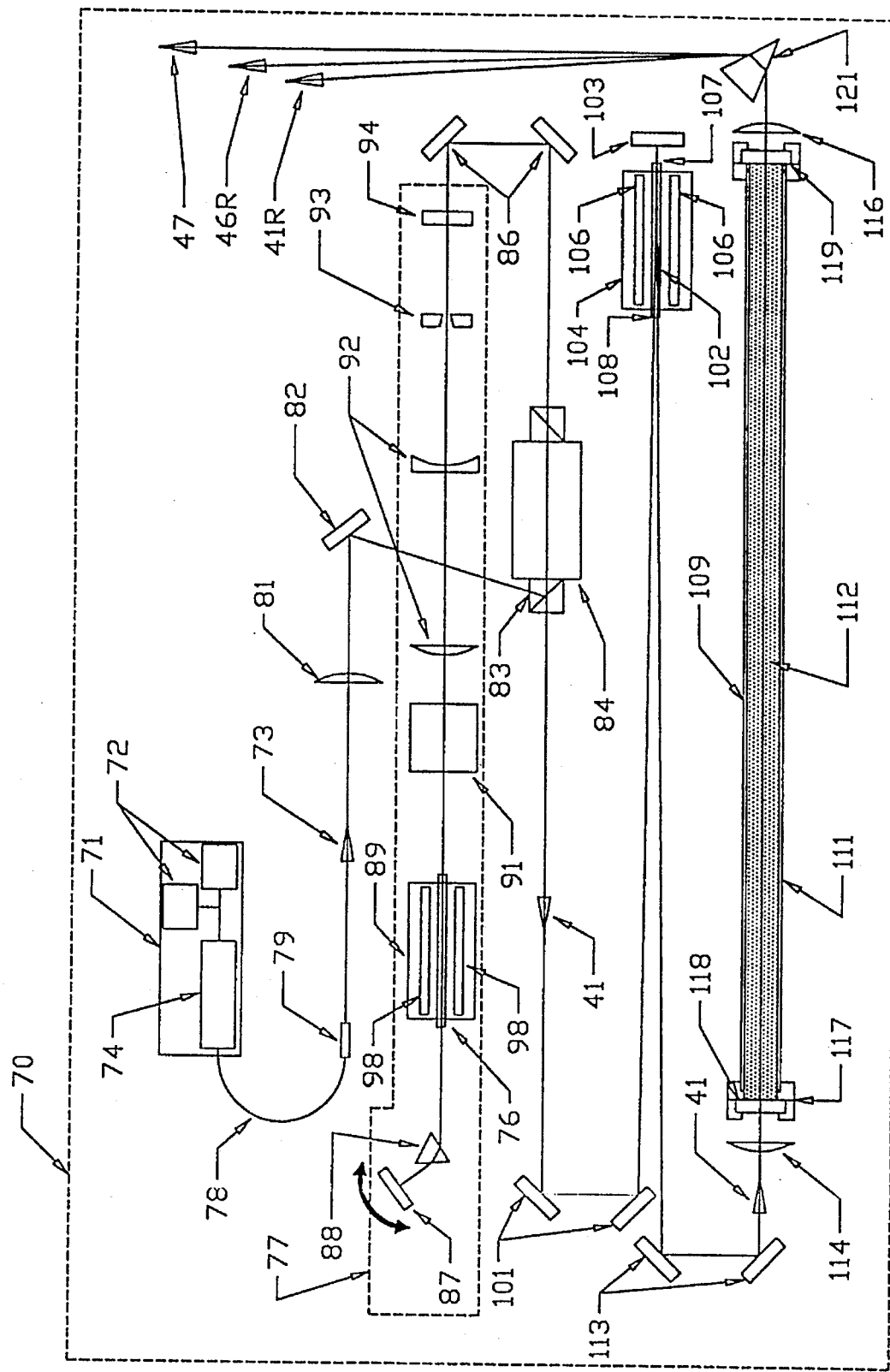
FIG. 15A is a more detailed schematic diagram of the embodiment shown in FIG. 14B, showing an injection seeder, an oscillator laser cavity and a Raman device for generating the output laser pulse at the tunable wavelength within the nominally 2 to 6 micron range according to the present invention.

Referring to FIGS. 14B and 15A, a preferred embodiment of the present invention is shown including apparatus for generating the output laser pulse 47 having any wavelength within the output range 48 of nominally 2 to 6 microns. A diode laser injection seeder 71 contains one or more single mode diode lasers 72 (FIG. 15A) with a typical emission bandwidth of about 0.0004 nm and typical output power of a few milliwatts continuous wave. The wavelength of seeder light 73 emitted from the injection seeder 71 can be tuned over a range of nominally 750 nm to 1000 nm by selecting different internal single mode diode lasers 72. Also, tuning may be done via temperature tuning, current tuning, or extended cavity tuning one of the internal single mode diode lasers 72. The diode laser injection seeder 71 also contains a Faraday isolator 74 with about 30 db or more of isolation to help prevent damage to the diode lasers 72 by leakage feedback. The seeder light 73 from the injection seeder 71 is used to cause an oscillator laser rod 76 of an oscillator laser cavity 77 to selectively lase at cavity mode wavelengths adjacent to the wavelength of the seeder light 73.

The seeder light 73 is coupled into the oscillator laser cavity 77 through a single mode polarization-maintaining optical fiber 78. The fiber 78 is oriented so that the seeder light 73 is s-polarized. The optical fiber 78 is terminated in a graded index lens 79 which nearly collimates the seeder light 73. Lens 81 matches the mode of the seed diode laser output 73 to the mode of the oscillator laser cavity 77. The seeder light 73 is then coupled into the oscillator laser cavity 77 by reflection off a high reflectivity turning mirror 82, and into a side entry/exit port 83 of a second Faraday isolator 84 which rotates the polarization of the seeder light to p-polarization. Then via turning mirrors 86 the seeder light 73 is transmitted into the oscillator laser cavity 77. The cavity 77 is formed by a highly reflective tiltable end mirror 87, a Brewster angle dispersing prism 88, the oscillator rod 76, an oscillator flashlamp pumping chamber 89, a Pockels cell Q-switch 91, an oscillator cavity telescope 92, an oscillator cavity aperture 93, and a partially reflective output coupler end mirror 94. The Brewster angle dispersing prism 88 and the tiltable end mirror 87 limit the wavelengths which will oscillate within the oscillator laser cavity 77 to a bandpass of about 0.1 nm. Wavelengths away from this interval are dispersed out of the cavity 77. The Brewster angle dispersing prism 88 also provides loss for s-polarized light to facilitate Q-switching. This nominal 0.1 nm oscillator bandpass can be selected within the 750 nm to 1000 nm wavelength range 44 by tilting the high reflectivity end mirror 87. The nominal 0.1 nm oscillator bandpass limits the number of modes which will oscillate in the cavity 77 and makes injection seeding easier.

Figure 1:
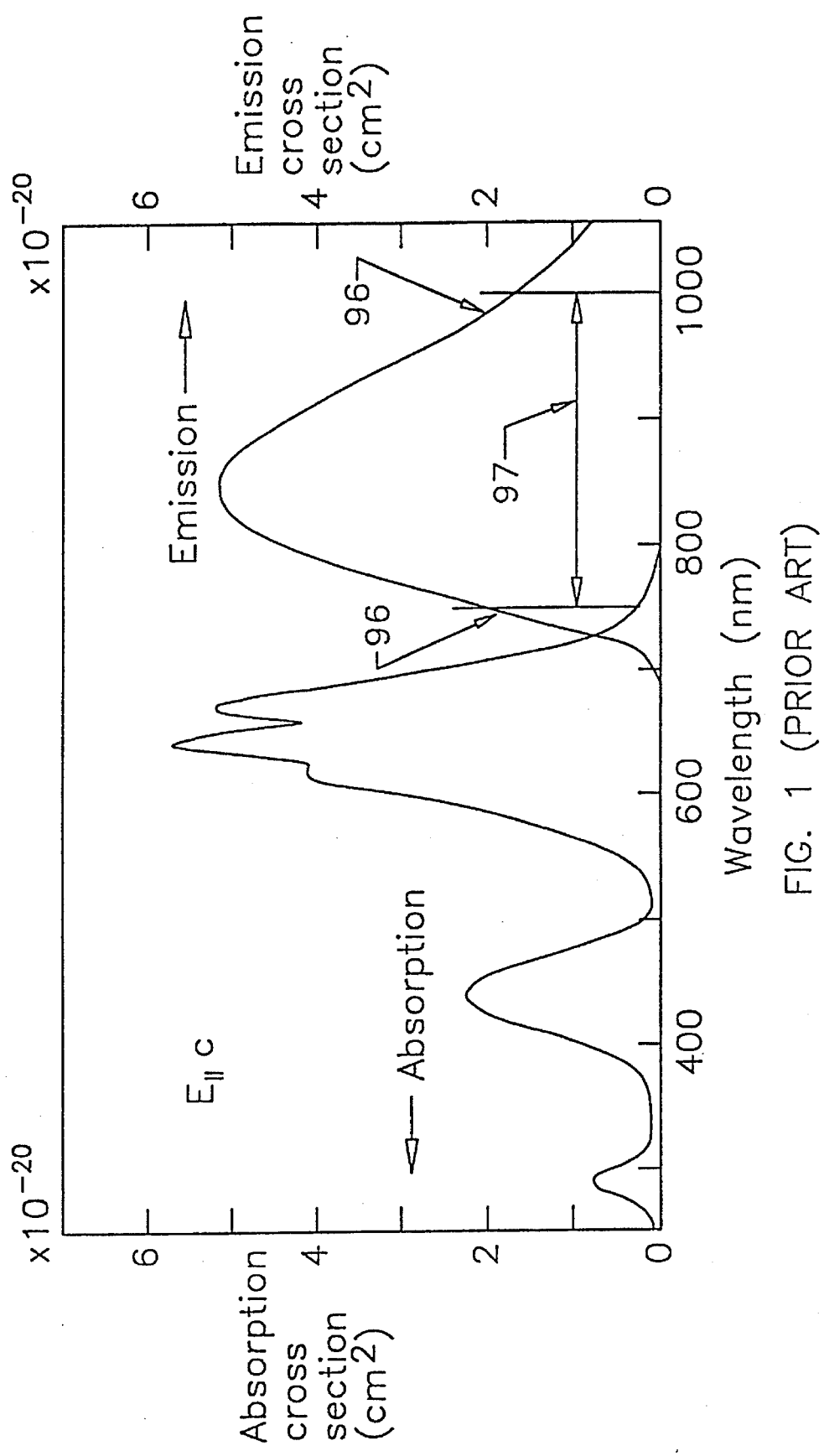
FIG. 1 is a graph of the absorption and emission cross sections for an oscillator rod fabricated from Cr:LiSAF, where the curves are for the polarization parallel to the c axis which is the polarization having the highest gain.

The power of the seeder light 73 inside the cavity 77 must dominate the spontaneous emission, which can be estimated using ½ photon per mode under the unseeded laser bandpass. For example, in the generator 70, sixteen microwatts of seeder light 73 inside the cavity 77 is effective to dominate the spontaneous emission by a factor of 100. Tuning the output wavelength of the oscillator light 41 therefore includes two steps: first, adjusting the diode laser injection seeder 71 to the selected wavelength, and then rotating the high reflectivity end mirror 87 so that the wavelength of the seeder light 73 (which has a bandwidth of nominally 0.0004 nm) is contained within the nominal 0.1 nm oscillation bandpass of the cavity 77. This limited 0.1 nm oscillator bandpass is most important when the chosen wavelength of the seeder light 73 is on the wings 96 (FIG. 1) of the emission band of the oscillator rod 76. To cover the entire 750 nm to 1000 nm band 44, different sets of end mirrors 87 and 94 with narrow band anti-reflection coatings should be used.

The oscillator flashlamp pumping chamber 89 has two flashlamps 98, one on either side of the rod 76. The discharge of the flashlamp 98 is nominally 150 microseconds in duration. A voltage near the ¼ wave voltage is applied to the Pockels cell Q-switch 91 just prior to firing the flashlamps 98. The voltage on the Pockels cell Q-switch 91 is shorted to zero to Q-switch out an initial laser pulse 41 having a nominally 90 ns duration. After the flashlamps 98 have fired, the high voltage supply (not shown) to the Pockels cell Q-switch 91 is turned off and the Pockels cell Q-switch 91 is shorted to ground until the next initial pulse 41 is requested.

The oscillator cavity telescope 92 expands the initial pulse 41 inside the oscillator cavity 77 to fill the oscillator rod 76 and acts to prevent optical damage to the oscillator rod 76. The oscillator cavity telescope 92 also provides focusing to generate a stable oscillator mode. The aperture 93 limits lasing to a single transverse mode.

In the embodiment shown in FIGS. 14B & 15A, the oscillator rod 76 is 5 mm in diameter and is made of Cr:LiSAF. When the oscillator laser rod 76 is made from Cr:LiSAF, the output coupler end mirror 94 has a nominal 60% reflectivity. The initial laser pulse 41 emitted from the oscillator laser cavity 77 has a Q-switched pulse energy of 50 to 75 mJ in the nominal 90 ns pulse duration, has a nominal bandwidth of 0.0004 nm, and is limited to longitudinal cavity modes adjacent to the wavelength of the seeder light 73. The initial laser pulse 41, which is the output of the oscillator laser cavity 77, is reflected off the turning mirrors 86, passed through the second Faraday isolator 84 (which contains two polarizers (not shown) and the side exit port 83) and is reflected by turning mirrors 101 before reaching an amplifier laser rod 102. The second Faraday isolator 84 acts as a one way light valve with a nominal isolation of 30 dB to prevent the powerful pulse from the amplifier laser rod 102 from leaking back to damage the optical fiber 78 or the diode laser injection seeder 71. The second Faraday isolator 84 combines with the first Faraday isolator 74 (contained internal to the diode laser injection seeder 71) to give a nominal 60 db isolation between the output of the oscillator cavity 77 (the initial pulse 41) and the seed diode laser 72.

The amplifier laser rod 102 is used to increase the power of the initial light pulse 41 to a peak value of at least 1 megawatt, which is the power at which the Raman device 43, for example, is responsive to shift the wavelength of the initial light pulse 41 to the second Stokes wavelength.

The amplified initial pulse 41 is then directed by a turning mirror 103 to make one or more passes through the amplifier laser rod 102. An amplifier flashlamp pumping chamber 104 is a duplicate of the oscillator flashlamp pumping chamber 89 and is also pumped by twin flashlamps 106 with a nominal 150 microsecond flashlamp discharge duration. The turning mirror 103 is a high reflector at the wavelength of the initial pulse 41 and is placed a few millimeters from an end 107 of the amplifier laser rod 102 to reduce beam clipping at an opposite end 108 of the amplifier laser rod 102. Although FIG. 15A illustrates two passes through the amplifier laser rod 102, any number of passes can be used, with two to four passes being typical.

In summary, the initial pulse 41 is amplified to a nominal 150 mJ pulse energy in a 90 ns pulse duration at a chosen wavelength (as selected by the diode laser injection seeder 71). The amplified initial laser pulse 41 has a nominal 0.0004 nm bandwidth and forms the input to a Raman device 109 of the laser pulse generator 70. The Raman device 109 includes a cell 111 which may be filled with H2 medium 112 and has a nominal length of 1 meter and a nominal fill pressure of 10 atmospheres. The Raman cell 111 is designed for response to input laser light, such as the initial laser pulse 41, having a minimum peak value of power (e.g. 1 MW). In response to such minimum peak value, the cell 111 shifts the wavelength of the input pulse to the second Stokes wavelength. In the case of the 150 mJ initial laser pulse 41, the minimum peak value of power is exceeded, and in response to the medium 112 in the cell 111 shifts the wavelength of the initial laser pulse 41 to the second Stokes wavelength, within the range 48 of from 2 to 6 microns.

If the pressure of the medium 45 in the Raman cell 111 is increased above 10 atmospheres, the time needed to reach equilibrium decreases. This improves the conversion of the pump light, or initial pulse, 41 to the first Stokes pulse 46 for the early part of the pump pulse (shown as 34a, 34b, and 34c in FIG. 3B), and decreases the conversion for the later part of the pulse 34. Since there is more energy in the early part of the depleted pump pulse 34 as shown in the curve 34c (FIG. 3), increasing the pressure gives some improvement in conversion efficiency. The Raman gain coefficient will not increase as the H2 pressure is increased above nominally 10 atmospheres because the effect of adding more scattering molecules is cancelled by the increased rate of collisions.

A further effect of increasing the pressure above 10 atmospheres is decreased efficiency of four-wave-mixing which generates the second Stokes pulse 47 and the anti-Stokes light. The decreased efficiency is a result of increased differences in the index of refraction between the pump light 41, the first Stokes pulse 46, the second Stokes pulse 47 and the anti-Stokes light wavelengths. The decreased four-wave-mixing efficiency has benefits because it reduces the loss to anti-Stokes, but is less desirable because it reduces conversion to second Stokes pulse 47. However, by adding a proper amount of phase matching gas to the medium 45, the second Stokes four-wave-mixing process efficiency is increased beyond that of the 10 atmospheres of pure H2 and the parasitic anti-Stokes four-wave-mixing competition will be below that of the 10 atmospheres pure H2 medium 45. The parasitic loss to anti-Stokes will thus be decreased for a higher pressure medium 45. The higher pressure also makes adding a second Stokes phase matching gas more important.

Referring to FIG. 15A, the initial amplified pump pulse 41 is reflected off turning mirrors 113 into the Raman cell 111 and is focused inside the Raman cell 111 by a focusing lens 114 effective at the wavelength of the initial pump pulse 41. The output of the Raman cell 111, which is the second Stokes pulse 47, is collimated again after leaving the cell 111 by another focusing lens 116 effective at the nominally 2 to 6 micron wavelength of the pulse 47. In particular, the initial pump pulse 41 is focused as close as possible to an input end 117 of the Raman cell 111 to prevent backward stimulated Raman scattering while still being focused far enough from an input Raman cell window 118 to prevent optical damage to the input window 118. The input Raman cell window 118 is anti-reflection coated and can, for example, be made of BK7 glass. An output Raman cell window 119 is also anti-reflection coated and has high transmission in the 2 to 6 micron range 48.

With the above-described phase matching, the output second Stokes pulse 47 from the Raman cell 111 is co-linear. The pulses from the Raman cell 111 include the second Stokes pulse 47, residual first Stokes output pulse 46R, and a residual pump pulse 41R. The pulses 41R, 46R and 47 have different wavelengths and thus are dispersed at different angles by a ZnSe Brewster dispersing prism 121. The final desired output of the Raman cell 111 in the nominally 2 to 6 micron wavelength range 48 is the second Stokes pulse 47.

Laser Pulse Generator 123

Figure 15B:
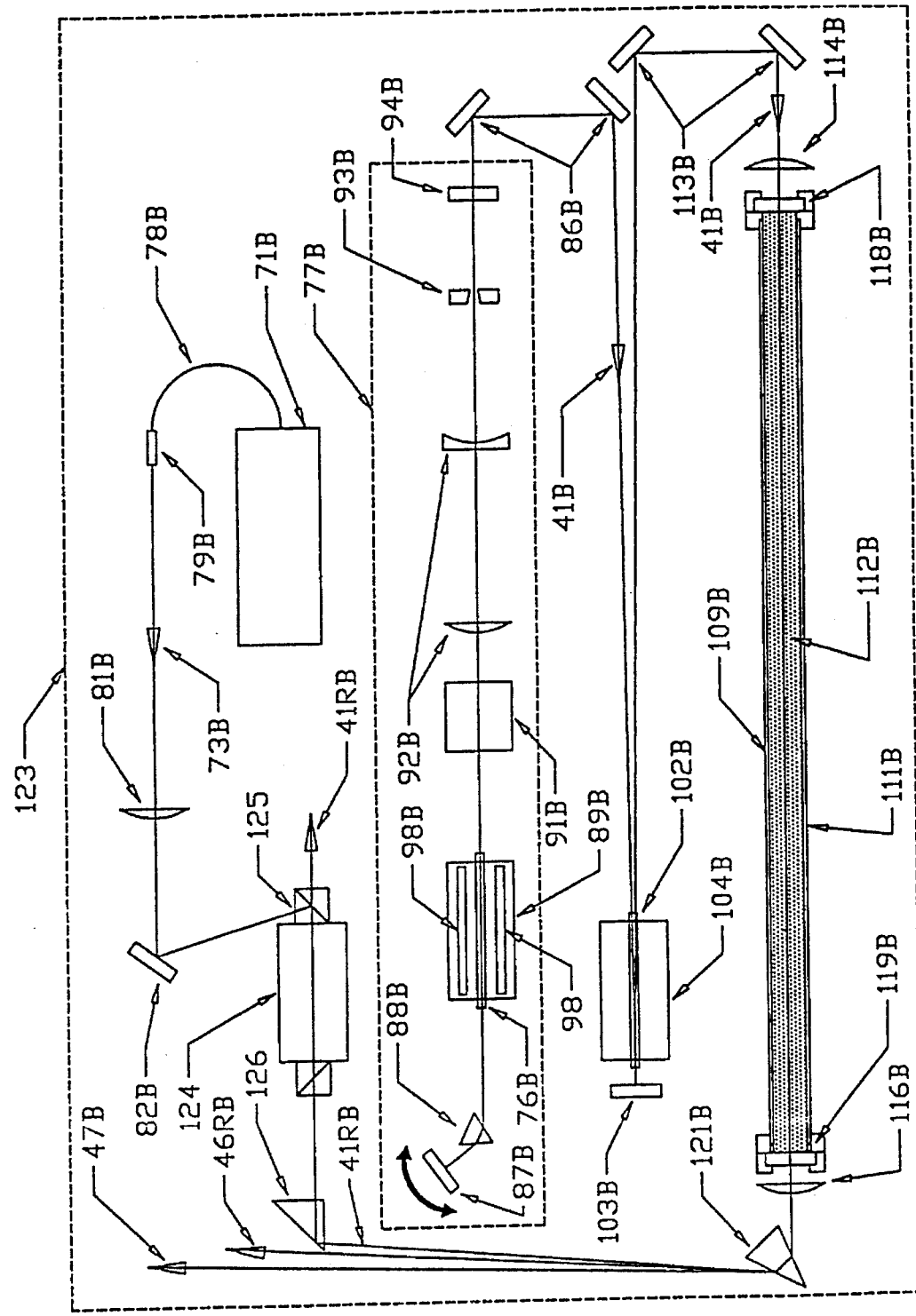
FIG. 15B is a detailed schematic diagram of a variation of the embodiment shown in FIG. 15A, differing in the location of a second Faraday isolator in the optical sequence of laser elements.

A somewhat different embodiment of a laser pulse generator of the present invention is shown in FIG. 15B. There, a laser pulse generator 123 is shown differing from the generator 70 of FIG. 15A essentially in the manner of coupling the diode laser injection seeder light 73 into the oscillator laser cavity 77. The elements of the generator 123 that are common to those of the generator 70 are identified in FIG. 15B with a "B" after the reference number used in FIG. 15A.

The generator 123 shown in FIG. 15B eliminates loss caused by the second Faraday isolator 84 (FIG. 15A) which is located between the oscillator cavity 77 and the Raman cell 111. In the generator 123 of FIG. 15B, a second Faraday isolator 124 couples injection seeder light 73B into a Raman device 109B and is not located in the path of the initial pump pulse 41 from the oscillator cavity 77. In greater detail, in FIG. 15B, the injection seeder light 73B is also mode matched to the oscillator cavity 77B by a lens 81B, and then injected into the second Faraday isolator 124 through a side entry/exit port 125 of the second Faraday isolator 124 to provide the seed light 73B at the proper wavelength via a Brewster prism 126. However, the injection point for the injection seeder light 73B in the generator 70 (FIG. 15A) is directly into the cavity 77 via the turning mirrors 86. This results in the Faraday oscillator 84 being the first element in the output path of the initial or pump light 41 from the cavity 77. Thus, after output of the pump light 41 from the cavity 77, the second Faraday isolator 84 is before the amplifier rod 102 and also before the Raman cell 111. On the other hand, the second Faraday isolator 124 is not in the path of the pump pulse 41B between the cavity 77B and the Raman device 109B nor is it before the Brewster prism 121B. Thus, in the generator 123 shown in FIG. 15B, the power of the oscillator output beam (which is the initial laser pulse or pump pulse 41B) is not reduced by the second Faraday isolator 124. This location of the second Faraday isolator 124 results in more input power to the amplifier rod 102B, more power of the amplified initial pulse 41B going to the Raman cell 111B, and more power of the Raman double shifted light (the second Stokes pulse 47B) which is the desired nominally 2 to 6 micron laser output of the generator 123.

In greater detail, the Faraday isolator injection point for the injection seeder light 73B in FIG. 15B lies only in the path of the residual pump pulse 41RB (via the Brewster prism 125), and not in the path of the residual first Stokes pulse 46RB, and not in the path of the second Stokes pulse 47 (the nominally 2 to 6 micron tunable output). This prevents the second Faraday isolator 124 from causing losses in the pump pulse 41B, while still mode matching the injection seeder light 73B to the oscillator cavity 77B and protecting the injection seeder 71B from being damaged by the powerful second Stokes output pulse 47B.

Oscillator Raman Device 109E

Figure 16:
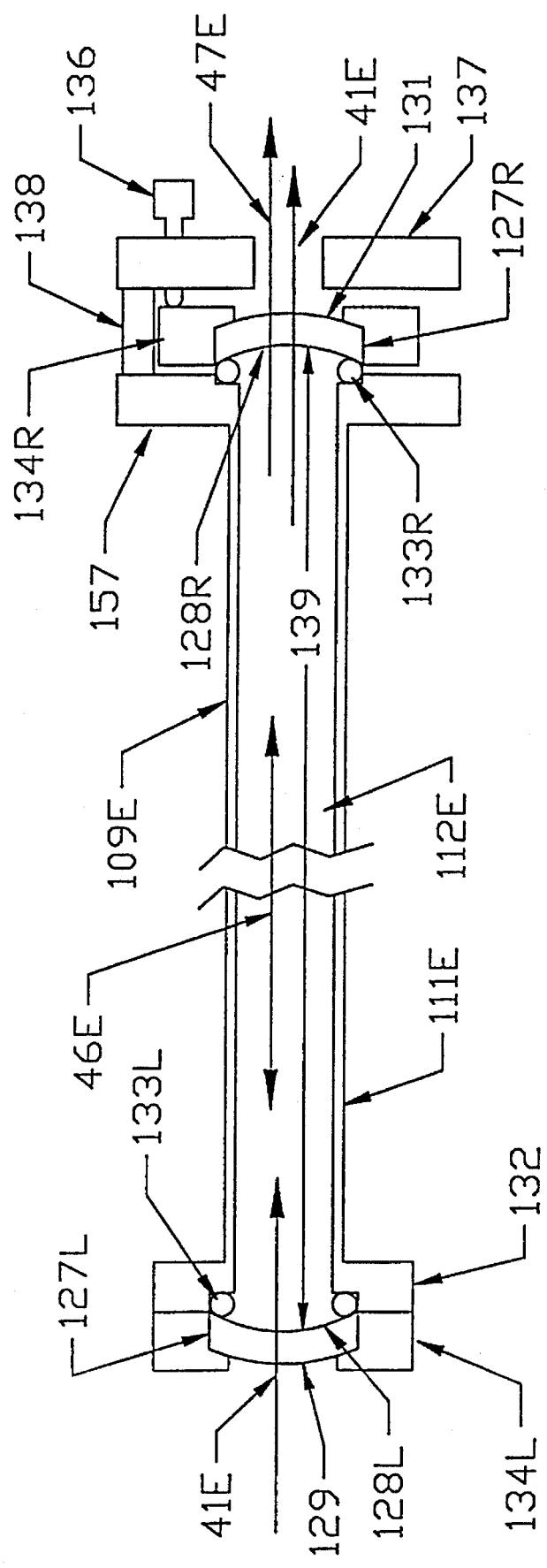
FIG. 16 is a detailed schematic diagram of a variation of the Raman device which captures the firsts Stokes light in a cavity.

In another embodiment of the present invention, the Raman device shown as 109 in FIG. 15A and 109B in FIG. 15B is modified and shown as a modified Raman device 109E in FIG. 16. The elements of the Raman device 109E that are common to those of the Raman device 109 are identified in FIG. 16 with an "E" after the reference number used in FIG. 15A. In this embodiment of the Raman device 109E the first Stokes light 46E resonates between two mirrors 127L and 127R which reflect the first Stokes pulse 46E and transmit both the pump pulse 41 and the second Stokes pulse 47. In this sense, the Raman device 109E is referred to as a resonator.

In greater detail, respective inner surfaces 128L and 128R of mirrors 127L and 127R are concave and coated to be better than 95% reflective at the wavelength of the first Stokes pulse 46. This coating transmits more than 95% at the wavelengths of both the pump pulse 41 and the second Stokes pulse 47. An outer surface 129 of the mirror 127L is convex and coated to be anti-reflective at the wavelength of the second Stokes pulse 47, while a convex surface 131 is coated to be anti-reflective at the wavelength of the pump pulse 41. The cell 111E has a flange 132 to accept an O-ring 133L. The mirror 127L is held against the O-ring 133L by a flange 134R. On the other end of the cell 111E a flange 135 also accepts an O-ring 133R for sealing against the mirror 127R. However, the mirror 127R is angularly adjustable so that the Raman cell 109E forms a stable resonator at the wavelength of the second Stokes pulse 47 by way of the surfaces 128L and 128R. A small amount of adjustment of the mirror 127R is provided by compressing the O-ring 133R using three screws 136 spaced at 120 degree intervals around a second flange 137 (only one of the screws 136 is shown). The flange 137 is held rigidly to the flange 135 by three spacers 138 (only one spacer is shown). The screws 136 adjust the mirror 127R by pushing against flange 134R. The alignment of the right mirror 127R to the left mirror 127L can be accomplished using a helium neon laser (not shown). Final alignment should be made with the Raman medium 112E in the cell 111E. The length 139 of the resonator 109E should be matched to the optical path length of the oscillator laser cavity 77 or 77B. The tolerance of this matching is nominally one fourth the coherence length of the pump pulse 41. This matching causes the phase fluctuations in the pump pulse 41 to match the phase fluctuations of the first Stokes pulse 46 on successive round trips of the first Stokes pulse 46 in the resonator 109E.

The Raman device 109E, with its resonator feature, results in better conversion of the pump pulse 41 to the second Stokes pulse 47 than the device 109 or 109B. This is because containing the first Stokes pulse 46 in the cavity between the mirrors 127L and 127R improves conversion of the pump light 41 to the first Stokes pulse 46 by effectively increasing the interaction length for the Raman scattering. In addition, the resonator formed by the inner surfaces 128L and 128R continually return the first Stokes pulse 46 to an interaction region between the mirrors 127L and 127R resulting in better conversion of the first Stokes pulse 46 to the second Stokes output 47.

Oscillator Rods of Laser Pulse Generators 40, 70, and 123

The laser pulse generators 40, 70, and 123 each have the respective oscillator laser cavities 42, 77 and 77B. Such cavities 42, 77, and 77B may be provided with one of many types of oscillator rods, such as the oscillator rod 76.

Cr:LiSAF Oscillator Rods 76, 76B & 140: When the generator 40, 70, or 123 is to be capable of generating the second Stokes output pulse 47 at any wavelength in the 2 to 6 micron range 48, Cr:LiSAF material is used to fabricate the oscillator rod, such as a rod 140 of the generator 40 or the rod 76 or the rod 76B. Oscillator rods 76, 76B or 140 made from Cr:LiSAF are available from Lightning Optical of Tampa Springs, Fla. in the 5 mm diameter size noted above and capable of generating the 50 to 75 mJ energy and 90 ms duration of the initial pump pulse 41 as described above. The absorption and emission cross section characteristics of Cr:LiSAF are shown in FIG. 1A and 1B, indicating that the material has a wide emission band and a strong absorption band which overlaps well with broadband flashlamp pumping or diode laser pumping at 670 nm. An additional feature of the Cr:LiSAF material is its long upper state lifetime of 67 microseconds compared with 3 microseconds for Ti:SAF.

In using Cr:LiSAF, care must be given to limiting thermal loading. For example, in applications using a flashlamp such as the flashlamp 98 or 106 (FIG. 15A), thermal loading is limited by limiting the average flashlamp pump power to about 1 kW. Pumping with a diode laser array, significantly reduces thermal loading. Also in the use of oscillator rods (such as the rod 76) made of Cr:LiSAF material, care is taken to avoid dissolving the rod in the coolant liquid (not shown). For example, dissolving can be avoided by maintaining the pH of coolant water between 6.2 and 7.8. Alternatively FC-75 material sold under the brand name FLUORINERT can be used as the coolant to prevent dissolving the oscillator rods 76, 132 and 140.

Cr:LiCAF and Alexandrite Oscillator Rods 76, 76B & 140: When a tunable oscillator rod 76, 76B, or 140 is desired and a narrower absorption cross section meets the particular requirements, the material for the oscillator rods 76, 76B or 140 may be Cr:LiCAF or Alexandrite. The long wavelength tuning limit for both of these materials is around 800 nm, which when used with the Raman devices 43 or 109 of the present invention, for example, provide a second Stokes pulse 47 having a wavelength of 2.4 microns. A double Raman shifted oscillator rod 76, 76B, or 140 based on these materials would cover most of the 2.0 micron to 2.5 micron atmospheric transmission window.

Ti:SAF Oscillator Rods 76, 76B, and 140: Another laser material which facilitates double Raman shifting with the Raman devices 43 or 109, for example, according to the present invention is flashlamp pumped Ti:SAF material. The tuning range of oscillator rods 76, 76B, and 140 made from this material is approximately 710 nm to 910 nm, which double Raman shifts in a Raman device 43 or 109 having H2 as the medium 45 to provide the second Stokes pulses 47 in a band of 1.73 microns to 3.73 microns. However, shorter storage times, e.g., three microseconds, are provided by Ti:SAF material. Thus, the pump pulse 41 in this case has a pulse duration comparable to the storage time of the Ti:SAF laser rod, as may be provided by the flashlamp 98.

Providing Pulses 47 At Any Wavelength In The Range 48

In selecting a particular laser pulse generator 40, 70, or 123 to generate any wavelength second Stokes output pulses 47 within the range 48, the desired wavelength and other characteristics (such as power) of the pulse 47 are generally known in advance. Therefore, using the principles of the present invention a laser pulse generator 40, 70 or 123 may be provided for generating such pulses 47 having those characteristics. Referring to FIG. 15A, it may be understood that the properties of certain elements of the generators are selected according to those characteristics of the second Stokes output pulse 47. The Brewster prisms 88 and 121, Q-switch 91, rods 76 and 102, isolator 84, windows 118 and 119, lenses 81, 114, and 116, and the telescope 92 generally operate across the whole 2 to 6 micron range 48. However, the operating band of the tiltable mirror 87 and the high reflecting mirrors 86, 101, 103, and 113 is generally not sufficiently broad to cover the 750 nm to 1000 nm tuning range required to cover the full 2 to 6 micron band second Stokes. These elements are selected according to the portion of the 2 to 6 micron range 48 in which the wavelength of the output pulse 47 is located. Also, in the case of the laser pulse generators 70 and 123 (shown in respective FIGS. 15A and 15B) which have the respective diode injection seeders 71 or 71B, a particular diode injection seeder is selected to have a tuning range covering the wavelength which is desired for the respective initial pump pulse 41 or 41B. Finally, as described above in respect to phase matching, the particular gases, including the index-modifying gas or gases, for the medium 45 in the Raman cells 51, 111 or 111B are selected according to the desired wavelength of the second Stokes pulse 47.

Coarse tuning (0.1 nm) of the oscillator cavity 77 is accomplished using the Brewster dispersing prism 88. Fine tuning (within 0.0004) nm is achieved by the described injection seeding via selection of the diode laser 72. The single mode polarization preserving fiber 78 couples the seeder light 73 from the diode lasers 72 into the oscillator cavity 77. This provides good spatial filtering of the seeder light 73 and removes the requirement of having the seeder and wavelength monitoring optics rigidly mounted to the main laser frame (not shown).

Apparatus For Generating Temporally Closely Spaced Output Laser Pulses 47 In the 2 to 6 Micron Wavelength Range 48

Figure 18:
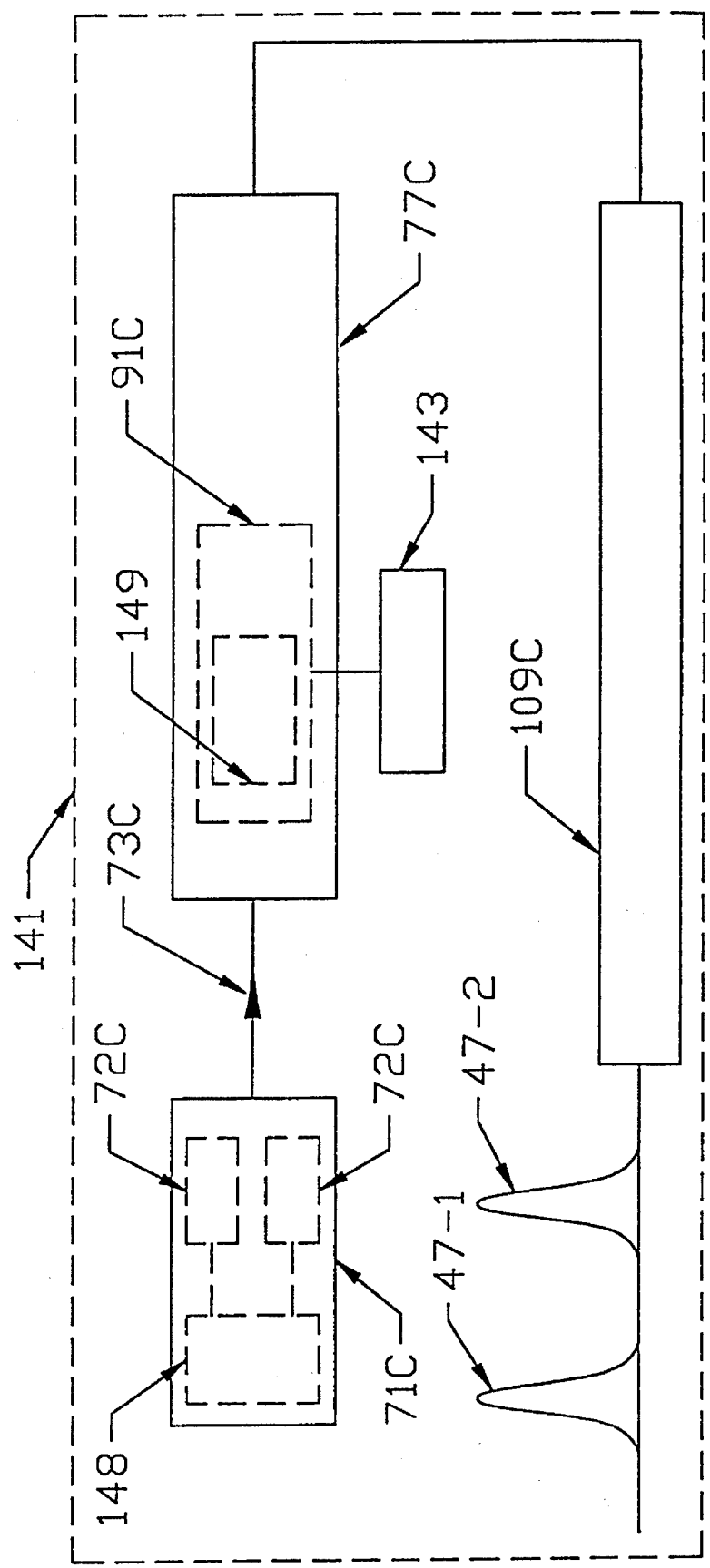
FIG. 18 is a schematic diagram of a generator for producing two closely spaced pulses in the 2 to 6 micron range.

Referring first to FIG. 18, another embodiment of the present invention is a multi-pulse laser pulse generator 141 which is based on most of the features of the laser pulse generators 40 or 70, with additional control features for generating a plurality of the second Stokes pulses 47. The features of the generator 141 that are common to the generator 70 are identified in FIG. 18 using the same reference numbers plus the letter "C", and reference is made to FIG. 15A for additional common features. Such pulses 47 are in the form of relatively high power, temporally closely spaced, output laser pulses 47C-1 and 47C-2 (FIG. 19) which occur within the duration of a single flashlamp discharge. In the generator 141, a first of the closely spaced output pulses 47C-1 may have any wavelength lambda 1 (FIG. 19) within the range 48 of nominally 2 to 6 microns. The second pulse 47C-2, succeeding closely spaced relative to the first pulse 47C-1, may have a chosen wavelength lambda 2 (FIG. 19) differing from the wavelength lambda 1 of the first laser pulse 47C-1 but still within the 0.1 nm bandwidth of oscillator 77. Such a high power, multiple pulse, 2 to 6 micron laser generator 141 is useful in fabricating 2–6 micron differential absorption (DIAL) lidar systems (not shown).

To provide an understanding of the multi-pulse generation provided by the generator 141, reference is made to FIGS.

Figure 17A:
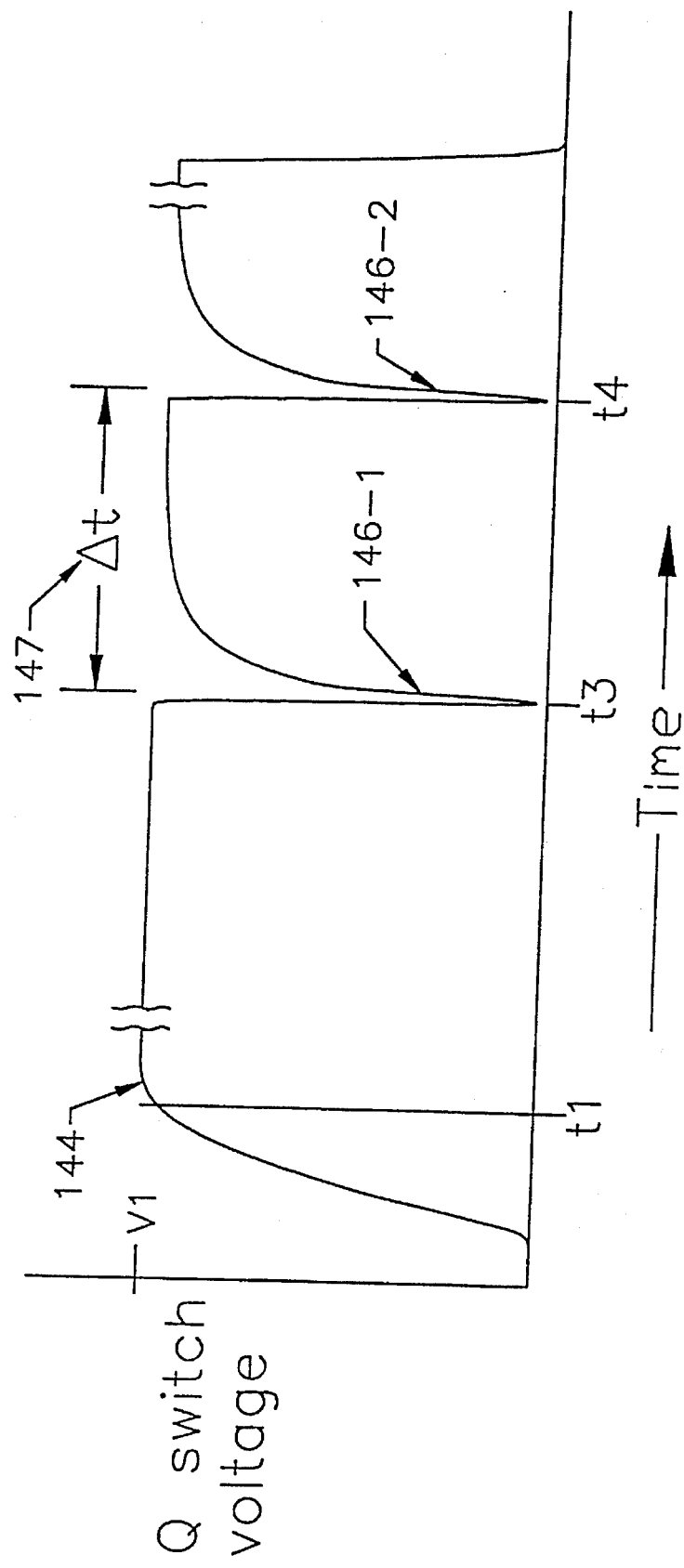
Figure 19:
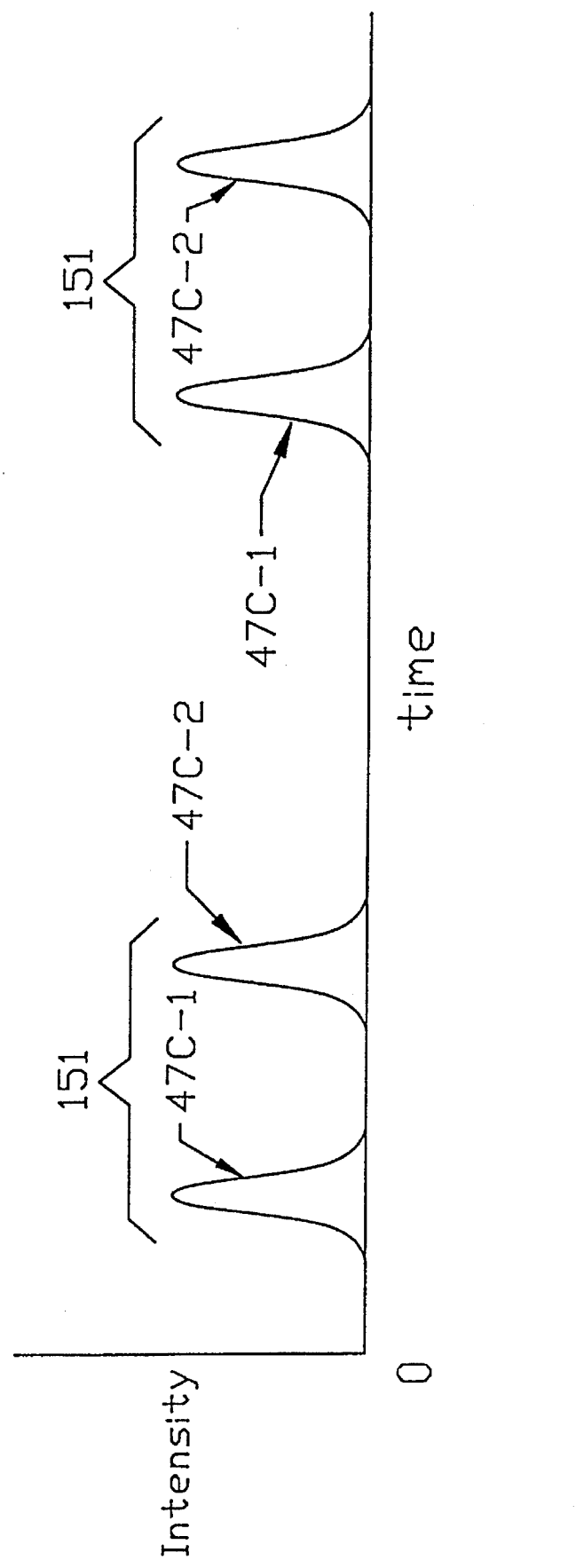
FIG. 19 is a graph of pulse intensity vs. time showing two pairs of closely spaced pulses in the 2 to 6 micron range.

17A through 17C, and FIGS. 18 and 19. FIG. 18 schematically shows the multi-pulse generator 141 based on the generator 70 (FIG. 14B) with such additional control features in the form of a controller or timer 143 for the Q-switch 91C (FIG. 15A). The operation of the controller 143 is described with respect to FIGS. 15A, 17A, and 18, where the voltage applied to the Q-switch 91C is shown as a function of time as a curve 144. As described above in respect to the oscillator flashlamp pumping chamber 89 (FIG. 15A), and as shown in FIG. 17B, a curve 145 (also referred to as a flash lamp pulse) shows the discharge (intensity) of the flashlamps 98 as being nominally 150 microseconds in duration. As shown in FIG. 17A, the controller 143 (FIG. 18) causes a voltage near the ¼ wave voltage V1 to be applied to the Pockels cell Q-switch 91C at a time t1 just prior to a time t2 (FIG. 17B) at which the flashlamps 98C (FIG. 15A) are fired. In particular, before firing the flashlamps 98, the high voltage V1 (FIG. 17A) is applied to the Pockels cell Q-switch 91C. The rise time of such high voltage can be nominally 20 ms. Then, at a time t3 the controller 143 (FIG. 18) causes the voltage V1 applied to the Pockels cell Q-switch 91 to be shorted to zero (or ground) to produce a first Q-switch pulse 146-1 (FIG. 17A) to Q-switch out a first initial laser pump pulse 41C-1 (FIG. 17C, corresponding to the pulse 41 of the generator 70). The voltage curve 144 then rises to the voltage V1 and remains there for a nominally 70 ms duration 147 (shown as delta t in FIG. 17A) which ends at a time t4. The initial pump pulse 41C-1 is shown in FIG. 17C as being generated at the time t3.

As shown in FIGS. 17A and 18, at the time t4 the controller 143 causes the voltage applied to the Q-switch 91C to be shorted to ground a second time within the 150 ms duration of the firing of the flashlamps 98C (rather than a just single pulse to ground as in the generator 70). The second shorting produces a second Q-switch pulse 146-2. The second Q-switch pulse 146-2 within the 150 ms duration of the firing of the flashlamps 98 Q-switches out a second initial laser pump pulse 41C-2 (FIG. 17C).

It may be understood that each of the first and second initial pulses 41C-1 and 41C-2 results in the generation of one of the second Stokes or output pulses 47, which are referred to with respect to the generator 141 as the respective first and second output, or second Stokes, pulses 47C-1 and 47C-2. The first Q-switch pulse 146-1, and the first initial pump pulse 41C-1 initiate the generation of the first 2–6 micron output pulse 47C-1 as described above in connection with the generation of the second Stokes pulse 47 (FIG. 14B).

The wavelength of the first output pulse 47C-1 is determined by the diode laser injection seeder 71C (FIG. 18). As described above in respect to FIG. 15A, the diode laser injection seeder 71C contains one or more of the single mode diode lasers 72C.

The wavelength of the seeder light 73C emitted from the injection seeder 71C is selectable over a range of nominally 750 nm to 1000 nm by selecting the appropriate diode laser and/or by temperature and/or diode laser drive current tuning. Selector 148 (FIG. 18) first causes the seeder 71C to emit the seeder light 73C at first wavelength lambda 1 prior to and during the pulse 47C-1 at time t3, and secondly to switch the seeder light 73C to wavelength lambda 2 during the pulse 47C-2 at the time t4 (FIG. 17A). Switching such wavelength from lambda 1 to lambda 2 can either be accomplished by abruptly changing the drive current to one laser diode 72C in the interval between the times t3 and t4, or just after the time t3 by turning off one of the diode lasers 72C operating at lambda 1 and turning on another diode laser 72C at wavelength lambda 2 just prior to the time t4. Both wavelengths lambda 1 and lambda 2 must be in the operating bandwidth of the oscillator laser cavity 77 or 77B. The output frequencies corresponding to the wavelengths lambda 1 and lambda 2 typically differ by nominally 1 cm$^{-1}$. Typical resonance absorption lines of interest have a width of 15 GHz or less, so this wavelength shift is sufficient to move off the absorption line.

The fall times of the Q-switch pulses 146-1 and 146-2 are about 100 ns, and the down time is about 1 microsecond to allow for the rise time of the Q-switched initial pulses 41C-1 and 41C-2. It may be understood then, that the two Q-switch pulses 146-1 and 146-2 are separated by the time interval 147 (delta t), which results in the same time interval 147 (delta t) between the first and second laser output pulses 47C-1 and 47C-2. Delta t is chosen to be nominally the storage time of the oscillator rod 76, 76B or 140. The 150 ms duration of the flashlamp pulse 144 is chosen to be roughly two or more times that of the duration 147 (delta t) between the Q-switch pulses 146-1 and 146-2. Thus for a rod 76, or 76B, or 140 made of Cr:LiSAF material, the duration of the pulse 144 of the flashlamp 98C is chosen to be nominally 150 microseconds.

After the flashlamp pulse 145 ends, a Q-switch high voltage power supply 149 (within the Q-switch 91C in FIG. 18) is shut off and the Pockels cell voltage (curve 144, FIG. 17A) is shorted to ground. The total time that the Q-switch voltage 144 is turned on is about 30 ms for each flashlamp pulse 145. Turning the Q-switch high voltage off between pulses 146-1 and 146-2 increases the lifetime of the Pockels cell Q-switch 91.

It may be understood then that during the time interval 147 (delta t), the wavelength of the seeder light 73C from the diode laser injection seeder 71C (FIG. 18) is changed, resulting in the two output pulses 47C-1 and 47C-2 being at different selected wavelengths, even though only nominally 67 microseconds apart and within the same flashlamp pulse 145.

The operation of the generator 141 in multiple Q-switching within a single flashlamp discharge may be extended to generate a plurality of pairs 151 of output pulses 47C-1 and 47C-2 (FIG. 19), wherein the wavelength of every one of such pulses is different, or alternate ones of the pulses 47C-1 and 47C-2 have a different wavelength.

Method of Generating The Output Laser Pulse 47 in the Two to Six Micron Wavelength Range 48

A method of the present invention generates the output laser pulse 47 having any wavelength within the nominal wavelength range 48 of 2 to 6 microns. Referring to FIG. 20, the method includes Step 156 of providing the oscillator laser cavity 42 (FIG. 14A) or 77 (FIG. 14B) capable of generating the initial pump pulse 41 having a wavelength of from 750 nm to 1000 nm. In Step 157, the oscillator laser cavity 42 or 77 is tuned to select the wavelength of the initial pump pulse 41 as any wavelength from 750 nm to 1000 nm. In Step 158, the oscillator laser cavity 42 or 77 is then Q switched to cause the oscillator rod 76 or 132 to generate the initial pump pulse 41. The wavelength of the initial pump pulse 41 is double Raman shifted in Step 159 into the range 48 of from nominally 2 to 6 microns to form the output laser pulse 47 having any given wavelength within the range 48. The shifting is performed by the Raman devices 43 or 109, for example, having the H2 medium 45 (or other Raman gas). The Raman devices 43 or 109 operate in response to the initial laser pulse 41 to generate the first Stokes pulse 46 and the second Stokes pulse 47.

Method of Generating The Output Laser Pulse 47 in the Two to Six Micron Wavelength Range 48, With Energetically Forbidding Higher Stokes Pulses In this method of the present invention, increases are achieved in the efficiency of conversion of the initial pulse 41 to the second Stokes pulse 47 by not allowing third and higher Stokes radiation to significantly occur. In particular, referring to FIG. 21, in Step 161 the parameters of the Raman device 43 are selected so that third and higher Stokes orders are energetically forbidden. As described above, such parameter selection includes Step 161A of selecting the H2 medium 45 in the Raman device 43 or 109. The fundamental Raman shift intrinsic to H2 is a wavenumber shift of 4155 $cm^{-1}$. The Step 161 also includes a Step 161B of selecting the initial laser pump pulse 41 to have any wavelength in the range 44 at or above a minimum wavelength for energetically forbidding the third and higher Stokes orders (referred to as the "minimum EF wavelength"). The minimum EF wavelength is, e.g., 802 nm using the H2 medium 45, and, for example, a wavelength of 900 nm may be used (or a wavenumber of 11,111.11 $cm^{-1}$). In this example, the first Raman shift in H2 will be to (11,111.11 $cm^{-1}$–4155 $cm^{-1}$)= 6956.11 $cm^{-1}$ and the second Raman shift in H2 will be to (6956.11 $cm^{-1}$–4155 $cm^{-1}$)=2801.11 $cm^{-1}$ (corresponding to 3.570 microns) which is within the design output wavelength of the second Stokes pulse 47. If a third Raman shift were to occur, it would be to (2801.11 $cm^{-1}$–4155 $cm^{-1}$)= –135389 $cm^{-1}$, which is physically impossible, and Cannot occur (is "energetically forbidden") in H2 since the second Raman shifted photon has less energy than the intrinsic Raman shift in H2. The further method of the present invention shown in FIG. 21 generates the output laser pulse 47 having any wavelength within a nominal wavelength range of 2.4 to 6 microns, which range is a subset of the range 48. This method includes a Step 162 of providing the oscillator laser cavity 42 (FIG. 14A) or 77 (FIG. 14B) capable of generating the initial pump pulse 41 having a wavelength of from the minimum EF wavelength (e.g., 802 nm) to 1000 nm, which is referred to as the "EF range". In Step 163, the oscillator laser cavity 42 or 77 is tuned to a wavelength in the EF range, e.g., of 802 nm to 1000 nm, such wavelength being the exemplary 900 nm, to select the wavelength of the initial pump pulse 41 as any wavelength from the minimum EF wavelength (802 nm) to 1000 nm (e.g., in this example, 900 nm). In step 164, the oscillator laser cavity 42 or 77 is Q switched to cause the oscillator rod 76, for example, to generate the 900 nm initial pump pulse 41. The wavelength (900 nm in this example) of the initial pump pulse 41 is double Raman shifted in Step 166. The first Raman shift in this example is to (11,111.11 $cm^{-1}$–4155 $cm^{-1}$)=6956.11 $cm^{-1}$ and the second Raman shift in this example is to (6956.11 $cm^{-1}$–4155 $cm^{-1}$)=2801.11 $cm^{-1}$ (corresponding to 3.570 microns), which is in the range 48 of from nominallly 2 to 6 microns to form the output laser pulse 47. In this method shown in FIG. 21, the elimination of the competing third Stokes process via selection of the wavelength of the initial pulse 41 (to be above the minimum EF wavelength of 802 nm) is a significant benefit because the photons then accumulate at the desired second Stokes wavelength, resulting in high conversion efficiency to the 2.4 to 6 micron output laser pulse 47 (corresponding to 3.570 microns in this example).

Method of Generating The Output Laser Pulse 47 in the Two to Six Micron Wavelength Range 48, With Phase Matching Second Stokes Generation and Four-Wave-Mixing A further method of the present invention shown in FIG. 22 is used for generation of the second Stokes pulse 47 wherein the process of generation second Stokes radiation is not sequential, such that relative phase matching between the pump pulse 41, the first Stokes pulse 46, and the second Stokes pulse 47 in the Raman medium 45 is required. The method achieves improved efficiency in the mid-IR range of output pulses 47, and lower power pump pulses 41 may be used by maintaining the above-described specific phase matching conditions in the Raman medium 45 between the initial laser pulse 41, the first Stokes pulse 46, and second Stokes pulse 47. This results in a much more complete conversion of the energy in the pump pulse 41 to the desired second Stokes pulse 47, and allows the process to begin at lower input powers of the pump light 41.

This method to achieve the above-described proper phase relationship, or phase matching, includes a Step 170 of selecting the medium 45 in the Raman cell, such as the cell 109, as H2 and small amounts of other phase-matching gases. In an embodiment of the method of the present invention, as illustrated in FIGS. 6 and 9, for example, the other phase-matching gases have an absorption resonance band below the second Stokes wavelength. In this manner, the bulk gas refractive index at the wavelength of the second Stokes pulse 47 is selectively changed to the desired straight line relationship. With such straight line relationship, the four-wave-mixing process is phase matched along the entire length x from the one end 49 (FIG. 14A) of the cell 51 to the other end 52 of the cell 51. The selection of the index-modifying gases for output laser pulses 47 may be made using the above-described modelling.

Referring to FIG. 22, this method of the present invention generates the output laser pulse 47 having any wavelength within a nominal wavelength range of 2 to 6 microns while maintaining the above-described specific phase matching conditions in the Raman medium 45 between the initial laser pulse 41, the first Stokes pulse 46, and the second Stokes pulse 47. As shown in FIG. 22, this method further includes a Step 171 of providing the oscillator laser cavity 42 (FIG. 14A) or 77 (FIG. 14B) capable of generating the initial pump pulse 41 having a wavelength of from 750 nm to 1000 nm. In Step 172, the oscillator laser cavity 42 or 77 is tuned to a wavelength in the range 44 from 750 nm to 1000 nm to select the wavelength of the initial pump pulse 41 as any wavelength from 750 nm to 1000 nm.

Having selected in Step 170 the medium 45 as H2 and one or more of the phase-modifying gases described above according to the particular wavelength desired for the initial pump pulse 41, an example of this embodiment of the method of the present invention may be as illustrated in FIGS. 6 and 9 where the other phase-modifying gas(es) have an absorption resonance band below the second Stokes wavelength. In this manner, the bulk gas refractive index at the wavelength of the second Stokes pulse 47 is selectively changed to the desired straight line relationship. With such straight line relationship, the four-wave-mixing process is phase matched along the entire length x from the one end 49 of the cell 51 to the other end 52 of the cell 51. Stated differently, in the Step 170, the phase matching criteria for efficiently driving the four-wave-mixing process to generate the second Stokes pulse 47 is met by having the bulk refractive index values of the Raman medium 45 at the particular wavelength of each of the initial pulse 41, the first Stokes pulse 46, and the second Stokes pulse 47 be co-linear, that is, they fall on a common straight line, such as the line 53 (see FIG. 6) when plotted against wavelength.

Then, in Step 173, the oscillator laser cavity 42 or 77 is Q-switched to cause the oscillator rod 76, for example, to generate the initial pump pulse 41. The wavelength of the initial pump pulse 41 is double Raman shifted in Step 174 in a process in the Raman medium 45 in which the above-described specific phase matching conditions are maintained between the initial laser pulse 41, the first Stokes pulse 46, and second Stokes pulse 47.

Method of Generating A Plurality of Laser Pulses 47C-1 and 47C-2 in the 2 to 6 Micron Wavelength Range 48

Referring to FIGS. 18, 19 and 23, another embodiment of the method of the present invention generates the multiple laser pulses 47C-1 and 47C-2 which occur within the duration of a single discharge of the flashlamp 98, for example. The first of the closely spaced output pulses 47C-1 may have any wavelength within the range 48 nominally 2 to 6 microns. The second pulse 47C-2, succeeding closely spaced relative to the first pulse 47C-1, may have a chosen wavelength differing from the wavelength of the first laser pulse 47C-1. This method may be understood by reference to the above description of FIGS. 17A through 17C, FIGS. 18 and 19, and FIG. 23. This method includes Step 181 of providing the oscillator laser cavity 42 (FIG. 14A) or 77 (FIG. 14B) capable of generating the initial pump pulse 41 having a wavelength of from 750 nm to 1000 nm. In Step 182, the flashlamps 98, for example, are operated at the time t2 (FIG. 16B) to produce the pulse 145 for the 150 ms duration, for example. As shown in FIG. 17B, the flashlamp pulse 145 may be nominally 150 microseconds in duration. In Step 183, the oscillator laser cavity 42 or 77 is tuned to a wavelength in the range 44 from 750 nm to 1000 nm to select the wavelength of the initial pump pulse 41 as any wavelength from 750 nm to 1000 nm. In Step 184, H2 is selected as the medium 45 in the Raman device 43 or 109. Then, in Step 185, the oscillator laser cavity 42 or 77 is Q switched to cause the oscillator rod 76 or 132 to generate the 750 to 1000 nm initial pump pulse 41C. In particular, the controller 143 causes the voltage applied to the Q-switch 91 to vary according to the curve 144, and causes a voltage near the ¼ wave voltage V1 to be applied to the Pockels cell Q-switch 91 at the time t1 just prior to the time t2 (FIG. 17B) at which the flashlamps 98 (FIG. 15A) are operated. Then, at the time t3 the controller 143 causes the voltage V1 applied to the Pockels cell Q-switch 91 to be shorted to zero (or ground) to produce the first Q-switch pulse 146-1 (FIG. 17A) to Q-switch out the first initial laser pump pulse 41C-1 (FIG. 17C, corresponding to the pulse 41 of the generator 70). The voltage curve 144 then rises to the voltage V1 and remains there for a nominally 90 ns duration 147 (shown as delta t in FIG. 17A) which ends at the time t4.

The wavelength of the initial pump pulse 41C is double Raman shifted in Step 186 to generate the second Stokes pulse 47C-1 having a wavelength in the range of from 2 to 6 microns. Then, in Step 187, the oscillator laser cavity 42 or 77 is again tuned, this time to a wavelength just different from the previously selected wavelength of the first initial pump pulse 41C-1 to generate the second initial pump pulse 41C-2. In Step 188, at the time t4, the oscillator laser cavity 42 or 77 is again Q-switched to cause the oscillator rod 76, for example, to generate the second initial pump pulse 41C-2 (FIG. 17C). In particular, as shown in FIGS. 17A and 18, at the time t4 the controller 143 causes the voltage applied to the Q-switch 91 to be shorted to ground a second time within the 150 ms duration of the firing of the flashlamps 98. The second shorting produces the second Q-switch pulse 146-2. The second Q-switch pulse 146-2 within the 150 ms duration of the operation of the flashlamps 98 Q-switches out the second initial laser pump pulse 41C-2 (FIG. 17C).

The wavelength of the second initial pump pulse 41C-2 is double Raman shifted in Step 189 to generate the second Stokes pulse 47C-2 having a wavelength in the range of from 2 to 6 microns, and just different from that of the pulse 47C-1.

As to Steps 183 and 187, the wavelengths of the first output pulse 47C-1 and the second output pulse 47C-2 are determined by the diode laser injection seeder 71C (FIG. 18). The wavelength of the seeder light 73C emitted from the injection seeder 71C is tunable over a range of nominally 750 nm to 1000 nm by the wavelength selector 148 (FIG. 18) which selects an appropriate one of the internal single mode diode lasers 72C according to the wavelength of the seeder light 73C emitted therefrom. The selector 148 operates to cause the seeder 71 or 71C to emit at wavelength lambda 1 prior to and during the time t3 of the first Q-switch pulse 146-1. The selector 148 causes the output wavelength of the seeder light 73 generated by the seeder 71 or 71C to shift to wavelength lambda 2 prior to time t4.

This multi-pulse method is particularly useful for differential absorption lidar (DIAL) where remote gas molecules are probed at two closely spaced wavelengths (e.g., at the wavelengths of the first pulse 47C-1, and at the wavelength of the second pulse 47C-2) to determine their concentration versus range. In greater detail, the duration of the flashlamp pulse 145 is shown in FIG. 17B as 150 microseconds FWHM, which as noted above, compares with a storage time of 67 microseconds of a Cr:LiSAF rod 76C. During the flash lamp pulse 145, the Q-switch 91C is operated twice with approximately 70 microseconds delay between the pulses 146-1' and 146-2. The first pulse 146-1 is generated on the absorption line of interest and the second pulse 146-2 is off resonance for making differential absorption measurements.

Based on the above description of the methods shown in FIGS. 21A, 21B and 22, it may be understood that such methods may be used in the method of FIG. 23 to achieve the advantages of the methods of FIGS. 21A, 21B and 22, in generating the plural pairs of pulses 151 or the two pulses 47C-1 and 47C-2.

It is to be understood that the scope of the present invention is to be defined by the appended claims and not limited by the foregoing description, which describes the presently preferred ways in which the present invention may be devised and still come within the scope of the present invention.

What is claimed is:

1. Apparatus for generating an output laser pulse having any wavelength within a range of 2 to 6 microns, said apparatus comprising:

an oscillator laser cavity comprising an oscillator rod made of tunable laser material capable of generating an initial laser pulse within a tuning range of from 750 to 1000 nm; and a Raman device coupled to said rod to shift the wavelength of said initial laser pulse into said range of from 2 to 6 microns to form said output laser pulse having a wavelength within said range, said Raman device being responsive to said initial laser pulse to generate radiation at first and second Stokes wavelengths, said output laser pulse being radiation at said second Stokes wavelength.

2. Apparatus for generating an output laser pulse having any wavelength within a range of 2 to 6 microns, said apparatus comprising:

an oscillator laser cavity comprising:

an oscillator rod made of tunable laser material capable of generating an initial laser pulse within a range of from 750 to 1000 nm;

a tuning element coupled to said rod and operable to tune said laser material;

a flashlamp operable to provide pump light to said rod; and a Q-switch to provide said initial laser pulse upon operation of said tuning element and said flashlamp; and a Raman device coupled to said rod to shift the wavelength of said initial laser pulse into said range of from 2 to 6 microns to form said output laser pulse having a wavelength within said range, said Raman device being responsive to said initial light pulse to generate radiation at first and second Stokes wavelengths, said output laser pulse being radiation at said second Stokes wavelength.

3. A method of generating an output laser pulse having any wavelength within a nominal wavelength range of 2 to 6 microns, comprising the steps of:

providing an oscillator laser cavity having an oscillator rod capable of generating an initial pump pulse having a wavelength of from 750 to 1000 nm, tuning said oscillator laser cavity to select the wavelength of said initial pump pulse as any wavelength from 750 to 1000 nm, Q switching said oscillator laser cavity to cause said oscillator rod to generate said initial pump pulse, and double Raman shifting the wavelength of the initial pump pulse into said range to form said output laser pulse having any given wavelength within said range.

4. A method of generating an output laser pulse in the two to six micron wavelength range with energetically forbidden higher Stokes pulses, wherein a Raman device is used for double shifting the wavelength of an initial laser pulse, comprising the steps of:

selecting the parameters of said Raman device so that third and higher Stokes orders are energetically forbidden, said selecting comprising selecting hydrogen as the medium in said device to provide a given fundamental Raman shift intrinsic to hydrogen, said selecting further comprising selecting said initial laser pump pulse to have any wavelength in a lower range at or above a minimum wavelength for energetically forbidding said third and higher Stokes orders;

providing an oscillator laser cavity capable of generating said initial pump pulse having a wavelength no less than said minimum wavelength;

tuning said oscillator laser cavity to a tuned wavelength in said lower range and not in excess of 1000 nm;

Q switching said cavity to generate said initial pump pulse having said tuned wavelength; and double Raman shifting said initial pump pulse to generate said output laser pulse in said range of from nominallly 2 to 6 microns, said selection step substantially eliminating said third and higher Stokes orders.

5. A method of generating an output laser pulse in the two to six micron wavelength range with phase matching, generation of second Stokes radiation and four-wave-mixing, wherein generation of said second Stokes radiation is not sequential, and there is relative phase matching between a pump pulse, first Stokes radiation, and said second Stokes radiation in a Raman medium in a Raman cell having a given length, wherein there is a bulk gas refractive index at the wavelength of each of said pump pulse, said first Stokes radiation, and said second Stokes radiation, which method comprises the steps of:

selecting, as the medium in said Raman cell, hydrogen and small amounts of at least one phase-matching gas having an absorption resonance band below the wavelength of said second Stokes radiation to provide said bulk gas refractive index at the wavelength of the second Stokes radiation having a straight line relationship with respect to said bulk gas refractive index at the wavelengths of both said pump pulse and said first Stokes radiation;

with such straight line relationship, said four-wave-mixing being phase matched along said entire length of said Raman cell;

providing an oscillator laser cavity having an oscillator rod capable of generating an initial pump pulse having a wavelength of from 750 to 1000 nm;

tuning said oscillator laser cavity to a wavelength in the range from 750 to 1000 nm to select the wavelength of said initial pump pulse as any wavelength from 750 to 1000 nm;

Q switching said oscillator laser cavity to cause said oscillator rod to generate said initial pump pulse;

double Raman shifting said initial pump pulse in said Raman medium so that said phase matching conditions are maintained between said initial laser pulse, said first Stokes radiation, and said second Stokes radiation.

6. A method of generating a plurality of laser output pulses in the 2 to 6 micron wavelength range, wherein a first of said output pulses may have any wavelength within said range, wherein a second output pulse succeeds closely spaced relative to said first output pulse and has a chosen wavelength differing from the wavelength of said first laser pulse, said method comprising the steps of:

providing an oscillator laser cavity capable of generating initial pump pulses having a wavelength of from 750 to 1000 nm;

operating flashlamps at a first time to produce a flash pulse for a selected duration exceeding said temporal spacing of said first and second output pulses;

tuning said oscillator laser cavity to a wavelength in the range from 750 to 1000 nm to select the wavelength of a first of said initial pump pulses as any wavelength from 750 to 1000 nm;

selecting hydrogen as the medium in a Raman device;

Q switching said oscillator laser cavity to generate said first initial pump pulse having the wavelength in the 750 to 1000 nm range;

double Raman shifting the wavelength of said first initial pump pulse to generate first Stokes radiation and said first output pulse as a second Stokes pulse having a wavelength in said range of from 2 to 6 microns;

tuning said oscillator laser cavity again to a wavelength different from the previously selected wavelength of said first initial pump pulse to generate a second of said initial pump pulses;

Q switching said oscillator laser cavity to cause said oscillator rod to generate said second initial pump pulse; and Raman shifting the wavelength of said second initial pump pulse to generate first Stokes radiation and said second output pulse as another second Stokes pulse having a wavelength in said range of from 2 to 6 microns, and different from that of said first output pulse.

7. Apparatus for generating a plurality of output laser pulses in a range of 2 to 6 microns, wherein a first of said output pulses may have any selected wavelength within said range, wherein a second of said output pulses is temporally closely spaced relative to said first output pulse and has a chosen wavelength differing from the wavelength of said first output pulse, said apparatus comprising:

an oscillator laser cavity comprising:

an oscillator rod made of tunable laser material capable of generating initial laser pulses within a range of from 750 to 1000 nm;

a tuning element coupled to said rod and operable to tune said laser material;

a flashlamp operable to provide pump light to said rod, said flashlamp operable to provide the pump light having a given duration; and a Q-switch to provide said initial laser pulses upon operation of said tuning element and said flashlamp;

a controller coupled to said Q-switch to cause said Q-switch to provide first and second ones of said initial laser pulses, said first and second pulses being temporally spaced by an interval less than said given duration;

a selector coupled to said tuning element and operable within the duration of said temporal spacing to successively select the selected wavelength of said first output pulse and said chosen wavelength of said second initial pulse; and a Raman device coupled to said rod to successively shift the wavelength of each of said initial laser pulses into said range of from 2 to 6 microns to form said temporally spaced output laser pulses having said respective selected and chosen wavelengths within said range, said Raman device being responsive to each of said initial light pulses to generate radiation at first and second Stokes wavelengths, each of said output laser pulses being radiation at said second Stokes wavelength.

8. A method of determining the minimum wavelength at which an initial laser pulse should be generated for double Raman shifting, wherein during said shifting to generate a second Stokes output laser pulse in the two to six micron wavelength range, third and higher Stokes pulses are energetically forbidden, said Raman shifting being performed in a cell having medium therein, said method comprising the steps of:

selecting hydrogen as the medium in said cell to provide a Raman shift intrinsic to hydrogen;

determining the wavenumber value of two Raman shifts in hydrogen;

selecting said wavenumber value as said minimum wavelength at which said initial laser pulse should be generated; and converting said selected wavenumber value to the corresponding wavelength to determine said minimum wavelength.

9. Apparatus according to claim 1, further comprising:
said Raman device comprising a cell having hydrogen medium therein.

10. Apparatus according to claim 1, further comprising:
said Raman device comprising a cell having hydrogen, deuterium, hydrogen deuteride, or methane medium therein.

11. Apparatus according to claim 1, further comprising:
said oscillator rod being fabricated from Cr:LiSAF.

12. Apparatus according to claim 1, further comprising:
said oscillator rod being fabricated from Cr:LiSAF, Cr:LiCAF, Ti:SAF, NdYAG or Cr:LiGdAlF6.

13. Apparatus according to claim 1, further comprising:
said Raman device comprising a cell containing a primary medium and one or more phase mixing gases therein, said primary medium and one or more phase mixing gases having a bulk refractive index vs. wavelength characteristic wherein the bulk refractive index values corresponding to the wavelengths of said initial, first Stokes, and second Stokes radiation are substantially linear.

14. Apparatus according to claim 13, further comprising:
said primary medium being hydrogen.

15. Apparatus according to claim 13, further comprising:
said primary medium being hydrogen, deuterium, hydrogen deuteride, or methane.

16. Apparatus according to claim 13, further comprising:
said primary medium is hydrogen and said one or more phase mixing gases are taken from the group consisting of $CO_2$, $NO_2$, $NH_3$, or $NO$.

17. Apparatus according to claim 13, further comprising:
said one or more phase mixing gases are taken from the group consisting of $CO_2$, $NO_2$, $NH_3$, or $NO$.

18. Apparatus according to claim 15, further comprising:
said one or more phase mixing gases are taken from the group consisting of $CO_2$, $NO_2$, $NH_3$, or $NO$.

19. Apparatus according to claim 1, further comprising:
said oscillator cavity further comprises an injection seeder providing a seeder light beam, said seeder being coupled to said Raman device to propagate said seeder light beam through said Raman device to said oscillator rod.

20. Apparatus according to claim 1, wherein said Raman device is normally capable of shifting said wavelength of said initial light pulse to third order and higher Raman shifts, further comprising:

a second device coupled to tune said tunable laser material of said oscillator rod so that said initial light pulse has a selected wavelength within said tuning range of from 750 to 1000 nm; and said Raman device comprises a cell having a selected medium therein, said selected Raman medium having an intrinsic Raman shift;

said selected wavelength and said selected medium being effective to energetically forbid said shifting of said wavelength of said initial light pulse to the third order and higher Raman shifts so that the wavenumber of said second Stokes radiation of said output laser pulse is less than the wavenumber of the intrinsic Raman shift of said selected Raman medium.

21. Apparatus according to claim 1, further comprising:
said Raman device comprising a Raman cell having end mirrors which reflect said first Stokes pulse to form a resonator at the wavelength of said first Stokes pulse.

22. Apparatus according to claim 2, further comprising:
said Raman device comprising a cell having hydrogen medium therein.

23. Apparatus according to claim 2, further comprising:
said Raman device comprising a cell having hydrogen, deuterium, hydrogen deuteride, or methane medium therein.

24. Apparatus according to claim 2, further comprising:
said oscillator rod being fabricated from Cr:LiSAF.

25. Apparatus according to claim 2, further comprising:
said oscillator rod being fabricated from Cr:LiSAF, Cr:LiCAF, Ti:SAF, NdYAG or Cr:LiGdAlF6.

26. Apparatus according to claim 2, further comprising:
said Raman device comprising a cell containing a mixture of a primary medium and one or more phase matching gases therein, said one or more phase matching gases having an absorption band at a wavelength longer than said second Stokes wavelength, said mixture comprising amounts of said primary medium and said one or more gases so that said mixture has a characteristic such that a plot of the bulk refractive index of the mixture against wavelength has bulk refractive index values corresponding to the wavelengths of said initial, first Stokes and second Stokes radiation lying generally along a straight line.

27. Apparatus according to claim 26, further comprising:
said primary medium being hydrogen.

28. Apparatus according to claim 26, further comprising:
said primary medium being hydrogen, deuterium, hydrogen deuteride, or methane.

29. Apparatus according to claim 26, further comprising:
said primary medium is hydrogen and said one or more phase matching gases are taken from the group consisting of CO2, NO2, NH3, or NO.

30. Apparatus according to claim 26, further comprising:
said one or more phase matching gases are taken from the group consisting of CO2, NO2, NH3, or NO.

31. Apparatus according to claim 28, further comprising:
said one or more phase matching gases are taken from the group consisting of CO2, NO2, NH3, or NO.

32. Apparatus according to claim 2, further comprising:
said tuning element comprising an injection seeder providing a seeder laser beam, said injection seeder being coupled to said Raman device to propagate said seeder laser beam through said Raman device to said oscillator rod, said propagation of said seeder laser beam through said Raman device mode matching said seeder laser beam to said oscillator cavity.

33. Apparatus according to claim 2, wherein said Raman device is normally capable of shifting said wavelength of said initial light pulse to third order and higher Raman shifts, further comprising:
said rod being tuned by said tuning element so that said initial light pulse has a selected minimum wavelength within said tuning range of from 750 to 1000 nm and a corresponding minimum wavenumber; and
said Raman device comprises a cell having a selected medium therein, said selected Raman medium having an intrinsic Raman shift identified by a given wavenumber, said wavelength of said second Stokes radiation of said output laser pulse having a corresponding wavenumber less than the wavenumber of said intrinsic Raman shift of said selected Raman medium;
said selected minimum wavelength and said selected Raman medium being selected so that said in operation of said Raman device said shifting of said wavelength of said initial light pulse to the third order and higher Raman shifts is energetically forbidden.

34. Apparatus according to claim 2, wherein said Raman device is normally capable of shifting said wavelength of said initial light pulse to third order and higher Raman shifts, further comprising:
said rod being tuned by said tuning element so that said initial light pulse has a selected wavelength within said tuning range of from 700 nm to 1000 nm; and
said Raman device comprises a cell having a selected medium therein, said selected Raman medium having an intrinsic Raman shift identified by a given wavenumber, said cell having an intense focus region;
said selected wavelength having a value such that with said selected Raman medium, in the operation of said Raman device said intrinsic shift of said wavelength of said initial light pulse to the third Stokes order results in a third Stokes wavelength of such length that said cell diffracts said third stokes radiation away from said intense focus region before depleting significant energy from said second Stokes radiation.

35. Apparatus according to claim 1, further comprising:
said Raman device comprising a cell having opposite ends, each of said ends being transmissive to said initial laser pulse having a wavelength within said tuning range of from 750 to 1000 nm, each of said ends also being highly reflective of said radiation at said first Stokes wavelength.

36. Apparatus according to claim 35 further comprising:
each of said ends of said cell of said Raman device comprising a mirror, each of said mirrors having an inner surface facing inside said cell and an outer surface facing outside said cell, each of said inner surfaces being concave and coated to be at least 95% reflective at the wavelength of said radiation at said first Stokes wavelength, each of said coatings on said inner surfaces being highly transmissive at the wavelengths of both said initial laser pulse and said radiation at said second Stokes wavelength.

37. Apparatus according to claim 35, further comprising:
each of said ends of said cell of said Raman device comprising a mirror to provide first and second mirrors;
said cell having a mount at one of said ends and connected to said first mirror at said end, said mount positioning said first mirror for movement relative to said second mirror.

38. Apparatus according to claim 2 in which said oscillator laser cavity has a given optical path length, further comprising:
said Raman device comprising a cell having opposite ends, each of said ends being transmissive to said initial laser pulse having a wavelength within said tuning range of from 750 nm to 1 micron, each of said ends also being highly reflective of said radiation at said first Stokes wavelength, said ends being spaced by a length matched to said optical path length of said oscillator laser cavity so that the phase fluctuations of said initial laser pulse match the phase fluctuations of said first radiation at said first Stokes wavelength on successive reflections of said radiation between said ends of said cell.

39. The method according to claim 3, further comprising:
said double Raman shifting being in hydrogen medium.

40. A method of generating a plurality of laser pulses in the two to six micron wavelength range according to claim 6, wherein phase matching, generation of such second Stokes output pulses and four-wave-mixing are provided, wherein there is relative phase matching between said phase matching between said initial pump pulses, said first Stokes radiation, and said second Stokes output pulses in a Raman medium having a given length, which method comprises further the steps of:
selecting, as the medium in said Raman cell, hydrogen and small amounts of at least one phase-matching gas having an absorption resonance band below the wavelengths of said second Stokes output pulses to provide a bulk gas refractive index at the wavelengths of the second Stokes output pulses having a straight line relationship with respect to said bulk gas refractive index at the wavelengths of both said pump pulse and said first Stokes radiation;

with such straight line relationship, said four-wave-mixing being phase matched along said entire length of said Raman cell;

said steps of double Raman shifting said first and second initial pump pulses in said Raman medium maintaining said phase matching conditions said respective initial pump pulses, said first Stokes radiation, and said second Stokes output pulses.

* * * * *